United States Patent
Hosseini et al.

(10) Patent No.: US 11,917,583 B2
(45) Date of Patent: Feb. 27, 2024

(54) RESOURCE INDICATION FOR DEVICE-TO-DEVICE COORDINATION

(71) Applicant: QUALCOMM Incorporated, San Diego, CA (US)

(72) Inventors: Seyedkianoush Hosseini, San Diego, CA (US); Wei Yang, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 219 days.

(21) Appl. No.: 17/444,426

(22) Filed: Aug. 4, 2021

(65) Prior Publication Data

US 2022/0046602 A1 Feb. 10, 2022

Related U.S. Application Data

(60) Provisional application No. 62/706,300, filed on Aug. 7, 2020.

(51) Int. Cl.
| | |
|---|---|
| *H04W 4/00* | (2018.01) |
| *H04W 28/26* | (2009.01) |
| *H04W 72/02* | (2009.01) |
| *H04W 72/20* | (2023.01) |
| *H04W 72/56* | (2023.01) |

(52) U.S. Cl.
CPC ........... *H04W 72/02* (2013.01); *H04W 28/26* (2013.01); *H04W 72/20* (2023.01); *H04W 72/56* (2023.01)

(58) Field of Classification Search
CPC ...... H04W 28/26; H04W 72/02; H04W 72/04
See application file for complete search history.

(56) References Cited

U.S. PATENT DOCUMENTS

| | | | |
|---|---|---|---|
| 11,601,789 B2 * | 3/2023 | Panteleev | ......... H04W 72/1263 |
| 2019/0274121 A1 | 9/2019 | Wu et al. | |

(Continued)

FOREIGN PATENT DOCUMENTS

WO   WO-2020011336 A1   1/2020

OTHER PUBLICATIONS

Huawei., et al., "On Sidelink Enhancement", 3GPP Draft, R1-2004602, 3GPP TSG RAN WG1 Meeting #101-e, 3rd Generation Partnership Project (3GPP), Mobile Competence Centre, 650, Route Des Lucioles, F-06921 Sophia-Antipolis Cedex, France, vol. RAN WG1. No. E-meeting, May 25, 2020-Jun. 5, 2020, May 16, 2020 (May 16, 2020), XP051886317, 3 Pages, Retrieved from the Internet: URL:https://ftp.3gpp.org/tsg_ran/WG1_RL1/TSGR1_101-e/Docs/R1-2004602.zip, R1-2004602.docx [retrieved on May 16, 2020], The whole document, Paragraph 1 Introduction, p. 1, Paragraph 3.2 Resource Allocation to Enhance Reliability and Reduce Latency, p. 2-p. 3.

(Continued)

*Primary Examiner* — Chi H Pham
*Assistant Examiner* — Elisabeth Benoit Magloire
(74) *Attorney, Agent, or Firm* — Harrity & Harrity LLP / Qualcomm

(57) ABSTRACT

Various aspects of the present disclosure generally relate to wireless communication. In some aspects, a user equipment (UE) may determine whether a resource is available for use by one or more other UEs. The UE may transmit a device-to-device coordination message to indicate whether the resource is available for use by the one or more other UEs. Numerous other aspects are provided.

29 Claims, 19 Drawing Sheets

(56) References Cited

U.S. PATENT DOCUMENTS

| | | | | |
|---|---|---|---|---|
| 2019/0394786 A1* | 12/2019 | Parron | ............... | H04W 4/46 |
| 2020/0008266 A1* | 1/2020 | Pan | ............... | H04L 1/1642 |
| 2021/0329597 A1* | 10/2021 | Kwak | ............... | H04W 4/40 |
| 2023/0069615 A1* | 3/2023 | Hu | ............... | H04W 72/121 |
| 2023/0122730 A1* | 4/2023 | Guo | ............... | H04W 72/21 |
| | | | | 370/329 |
| 2023/0131353 A1* | 4/2023 | Miao | ............... | H04W 72/02 |
| | | | | 370/329 |
| 2023/0164814 A1* | 5/2023 | Miao | ............... | H04W 72/40 |
| | | | | 370/329 |

OTHER PUBLICATIONS

International Search Report and Written Opinion—PCT/US2021/071123—ISA/EPO—dated Dec. 10, 2021.

* cited by examiner

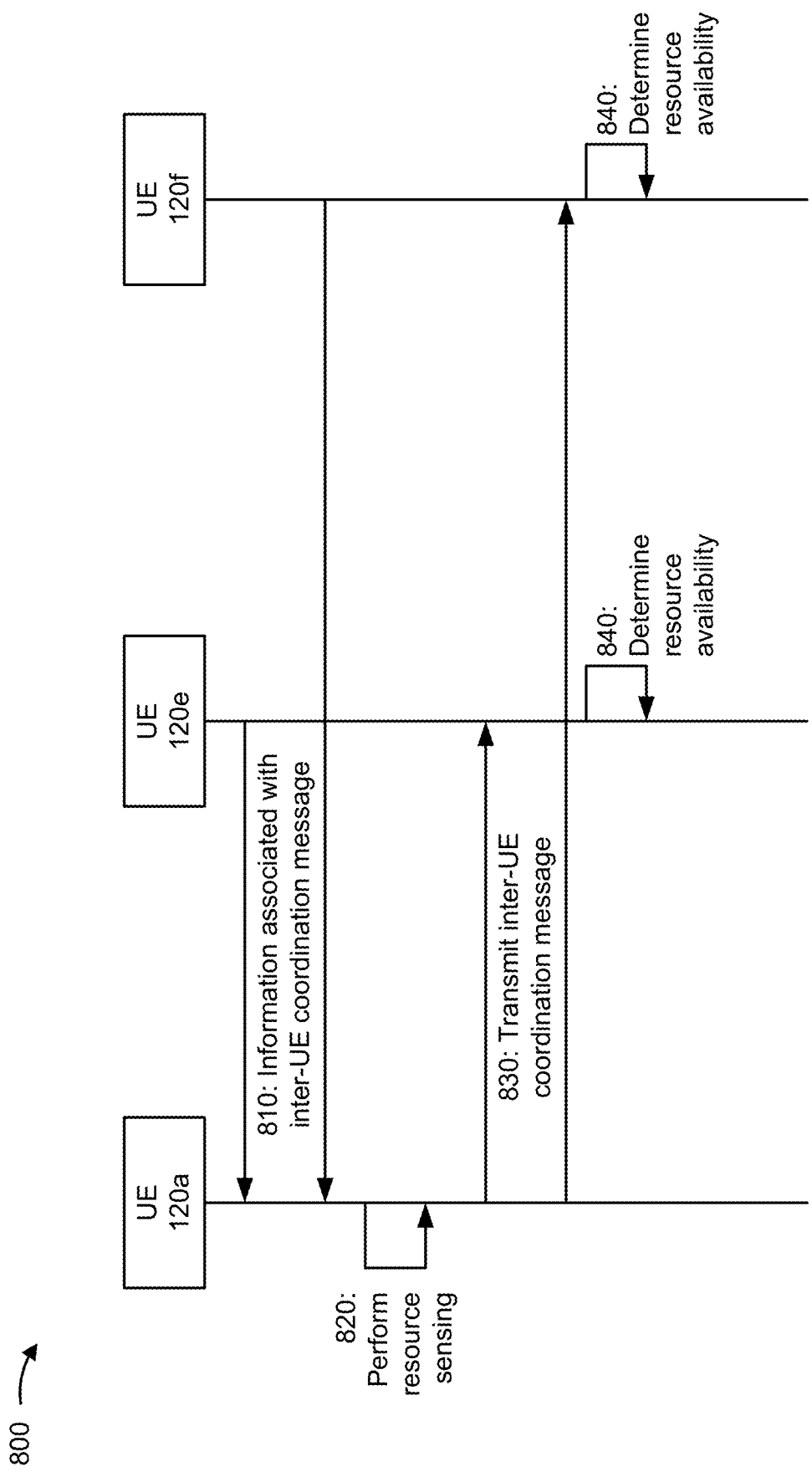

RESOURCE INDICATION FOR DEVICE-TO-DEVICE COORDINATION

CROSS-REFERENCE TO RELATED APPLICATION

This Patent Application claims priority to U.S. Provisional Patent Application No. 62/706,300, filed on Aug. 7, 2020, entitled "RESOURCE INDICATION FOR DEVICE-TO-DEVICE COORDINATION," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for device-to-device coordination messaging.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining whether a resource is available for use by one or more other UEs. The method includes transmitting a device-to-device coordination message to indicate whether the resource is available for use by the one or more other UEs.

In some aspects, a method of wireless communication performed by a UE includes receiving a device-to-device coordination message indicating whether a resource is available for use by one or more UEs. The method includes determining whether the resource is available for use by the UE based at least in part on the device-to-device coordination message.

In some aspects, a UE for wireless communication includes a memory and one or more processors coupled to the memory, the memory and the one or more processors configured to determine whether a resource is available for use by one or more other UEs. The memory and the one or more processors may be configured to transmit a device-to-device coordination message to indicate whether the resource is available for use by the one or more other UEs.

In some aspects, a UE for wireless communication includes a memory and one or more processors coupled to the memory, the memory and the one or more processors configured to receive a device-to-device coordination message indicating whether a resource is available for use by one or more UEs. The memory and the one or more processors may be configured to determine whether the resource is available for use by the UE based at least in part on the device-to-device coordination message.

In some aspects, a non-transitory computer-readable medium storing a set of instructions for wireless communication includes one or more instructions that, when executed by one or more processors of a UE, cause the UE to determine whether a resource is available for use by one or more other UEs, and transmit a device-to-device coordination message to indicate whether the resource is available for use by the one or more other UEs.

In some aspects, a non-transitory computer-readable medium storing a set of instructions for wireless communication includes one or more instructions that, when executed by one or more processors of an UE, cause the UE to receive a device-to-device coordination message indicating whether a resource is available for use by one or more UEs, and determine whether the resource is available for use by the UE based at least in part on the device-to-device coordination message.

In some aspects, an apparatus for wireless communication includes means for determining whether a resource is available for use by one or more other apparatuses. The apparatus may include means for transmitting a device-to-device coordination message to indicate whether the resource is available for use by the one or more other apparatuses.

In some aspects, an apparatus for wireless communication includes means for receiving a device-to-device coordination message indicating whether a resource is available for use by one or more apparatuses. The apparatus includes means for determining whether the resource is available for use by the apparatuses based at least in part on the device-to-device coordination message.

Some aspects described herein relate to a method of wireless communication performed by a UE. The method may include receiving a request for a device-to-device coordination message to indicate whether a resource is available for use by one or more UEs. The method may include transmitting the device-to-device coordination message to indicate whether the resource is available for use by the one or more UEs, wherein the device-to-device coordination message includes a bit indicator indicating whether the resource is at least one of unavailable to a UE that requested transmission of the single device-to-device coordination message, available to the UE that requested transmission of the single device-to-device coordination message and subject to resource reservation by another UE, available to any UE, or unavailable to any UE except the UE that requested transmission of the single device-to-device coordination message.

Some aspects described herein relate to a method of wireless communication performed by a UE. The method may include receiving a UE-common device-to-device coordination message transmitted to a plurality of UEs. The method may include communicating on an available resource identified by a content of the UE-common device-to-device coordination message and identified by whether the UE attempted to reserve the resource.

Some aspects described herein relate to a method of wireless communication performed by a UE. The method may include receiving a device-to-device coordination message indicating whether a resource is available for use by one or more UEs, wherein the device-to-device coordination message includes a bit indicator indicating whether the resource is at least one of unavailable to a UE that requested transmission of the device-to-device coordination message, available to the UE that requested transmission of the device-to-device coordination message and subject to another resource reservation by another UE, available to any UE, or unavailable to any UE except the UE that requested transmission of the device-to-device coordination message. The method may include communicating on an available resource identified by the device-to-device coordination message.

Some aspects described herein relate to a method of wireless communication performed by a UE. The method may include receiving a device-to-device coordination message indicating whether a resource is available for use by one or more UEs. The method may include communicating on an available resource identified in the device-to-device coordination message, wherein the available resource is associated with a prioritization relative to one or more other available resources identified in the device-to-device coordination message.

Some aspects described herein relate to a method of wireless communication performed by a base station. The method may include receiving first signaling identifying a UE as configured for device-to-device communication. The method may include transmitting second signaling indicating a configuration for a device-to-device coordination message associated with an identification of available resources for device-to-device communication.

Some aspects described herein relate to a UE for wireless communication. The UE may include a memory and one or more processors coupled to the memory. The one or more processors may be configured to receive information associated with (e.g., a request or a configuration for) a device-to-device coordination message to indicate whether a resource is available for use by one or more UEs. The one or more processors may be configured to transmit the device-to-device coordination message to indicate whether the resource is available for use by the one or more UEs, wherein the device-to-device coordination message includes a bit indicator indicating whether the resource is at least one of unavailable to a UE that requested transmission of the single device-to-device coordination message, available to the UE that requested transmission of the single device-to-device coordination message and subject to resource reservation by another UE, available to any UE, or unavailable to any UE except the UE that requested transmission of the single device-to-device coordination message.

Some aspects described herein relate to a UE for wireless communication. The UE may include a memory and one or more processors coupled to the memory. The one or more processors may be configured to receive a UE-common device-to-device coordination message transmitted to a plurality of UEs. The one or more processors may be configured to communicate on an available resource identified by a content of the UE-common device-to-device coordination message and identified by whether the UE attempted to reserve the resource.

Some aspects described herein relate to a UE for wireless communication. The UE may include a memory and one or more processors coupled to the memory. The one or more processors may be configured to receive a device-to-device coordination message indicating whether a resource is available for use by one or more U #s, wherein the device-to-device coordination message includes a bit indicator indicating whether the resource is at least one of unavailable to a UE that requested transmission of the single device-to-device coordination message, available to the UE that requested transmission of the single device-to-device coordination message and subject to resource reservation by another UE, available to any UE, or unavailable to any UE except the UE that requested transmission of the single device-to-device coordination message. The one or more processors may be configured to communicate on an available resource identified by the device-to-device coordination message.

Some aspects described herein relate to a UE for wireless communication. The UE may include a memory and one or more processors coupled to the memory. The one or more processors may be configured to receive a device-to-device coordination message indicating whether a resource is available for use by one or more Ues. The one or more processors may be configured to communicate on an available resource identified in the device-to-device coordination message, wherein the available resource is associated with a prioritization relative to one or more other available resources identified in the device-to-device coordination message.

Some aspects described herein relate to a base station for wireless communication. The base station may include a memory and one or more processors coupled to the memory. The one or more processors may be configured to receive first signaling identifying a UE as configured for device-to-device communication. The one or more processors may be configured to transmit second signaling indicating a configuration for a device-to-device coordination message associated with an identification of available resources for device-to-device communication.

Some aspects described herein relate to a non-transitory computer-readable medium that stores a set of instructions for wireless communication by a UE. The set of instructions, when executed by one or more processors, may cause the one or more processors to receive information associated with (e.g., a request for or configuration information for) a device-to-device coordination message to indicate whether a resource is available for use by one or more UEs. The set of instructions, when executed by one or more processors, may cause the one or more processors to transmit the device-to-device coordination message to indicate whether the resource is available for use by the one or more UEs, wherein the device-to-device coordination message includes a bit indicator indicating whether the resource is at least one of unavailable to a UE that requested transmission of the single device-to-device coordination message, available to the UE that requested transmission of the single device-to-device coordination message and subject to resource reservation by another UE, available to any UE, or unavailable to any UE except the UE that requested transmission of the single device-to-device coordination message.

Some aspects described herein relate to a non-transitory computer-readable medium that stores a set of instructions for wireless communication. The set of instructions, when executed by one or more processors, may cause the one or more processors to receive a UE-common device-to-device coordination message transmitted to a plurality of UEs. The set of instructions, when executed by one or more processors, may cause the one or more processors to communicate on an available resource identified by a content of the UE-common device-to-device coordination message and identified by whether the UE attempted to reserve the resource.

Some aspects described herein relate to a non-transitory computer-readable medium that stores a set of instructions for wireless communication. The set of instructions, when executed by one or more processors, may cause the one or more processors to receive a device-to-device coordination message indicating whether a resource is available for use by one or more UEs, wherein the device-to-device coordination message includes a bit indicator indicating whether the resource is at least one of unavailable to a UE that requested transmission of the single device-to-device coordination message, available to the UE that requested transmission of the single device-to-device coordination message and subject to resource reservation by another UE, available to any UE, or unavailable to any UE except the UE that requested transmission of the single device-to-device coordination message. The set of instructions, when executed by one or more processors, may cause the one or more processors to communicate on an available resource identified by the device-to-device coordination message.

Some aspects described herein relate to a non-transitory computer-readable medium that stores a set of instructions for wireless communication by a UE. The set of instructions, when executed by one or more processors, may cause the one or more processors to receive a device-to-device coordination message indicating whether a resource is available for use by one or more UEs. The set of instructions, when executed by one or more processors, may cause the one or more processors to communicate on an available resource identified in the device-to-device coordination message, wherein the available resource is associated with a prioritization relative to one or more other available resources identified in the device-to-device coordination message.

Some aspects described herein relate to a non-transitory computer-readable medium that stores a set of instructions for wireless communication by a base station. The set of instructions, when executed by one or more processors of the base station, may cause the base station to receive first signaling identifying a UE as configured for device-to-device communication. The set of instructions, when executed by one or more processors of the base station, may cause the base station to transmit second signaling indicating a configuration for a device-to-device coordination message associated with an identification of available resources for device-to-device communication.

Some aspects described herein relate to an apparatus for wireless communication. The apparatus may include means for receiving a request for a device-to-device coordination message to indicate whether a resource is available for use by one or more UEs. The apparatus may include means for transmitting the device-to-device coordination message to indicate whether the resource is available for use by the one or more UEs, wherein the device-to-device coordination message includes a bit indicator indicating whether the resource is at least one of unavailable to a UE that requested transmission of the single device-to-device coordination message, available to the UE that requested transmission of the single device-to-device coordination message and subject to resource reservation by another UE, available to any UE, or unavailable to any UE except the UE that requested transmission of the single device-to-device coordination message.

Some aspects described herein relate to an apparatus for wireless communication. The apparatus may include means for receiving a UE-common device-to-device coordination message transmitted to a plurality of UEs. The apparatus may include means for communicating on an available resource identified by a content of the UE-common device-to-device coordination message and identified by whether the apparatus attempted to reserve the resource.

Some aspects described herein relate to an apparatus for wireless communication. The apparatus may include means for receiving a device-to-device coordination message indicating whether a resource is available for use by one or more UEs, wherein the device-to-device coordination message includes a bit indicator indicating whether the resource is at least one of unavailable to a UE that requested transmission of the device-to-device coordination message, available to the UE that requested transmission of the device-to-device coordination message and subject to another resource reservation by another UE, available to any UE, or unavailable to any UE except the UE that requested transmission of the device-to-device coordination message. The apparatus may include means for communicating on an available resource identified by the device-to-device coordination message.

Some aspects described herein relate to an apparatus for wireless communication. The apparatus may include means for receiving a device-to-device coordination message indicating whether a resource is available for use by one or more UEs. The apparatus may include means for communicating on an available resource identified in the device-to-device coordination message, wherein the available resource is associated with a prioritization relative to one or more other available resources identified in the device-to-device coordination message.

Some aspects described herein relate to an apparatus for wireless communication. The apparatus may include means for receiving first signaling identifying a UE as configured for device-to-device communication. The apparatus may include means for transmitting second signaling indicating a configuration for a device-to-device coordination message associated with an identification of available resources for device-to-device communication.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 8A-8B are diagrams illustrating examples associated with resource indication for device-to-device coordination, in accordance with the present disclosure.

DETAILED DESCRIPTION

Figure 1:
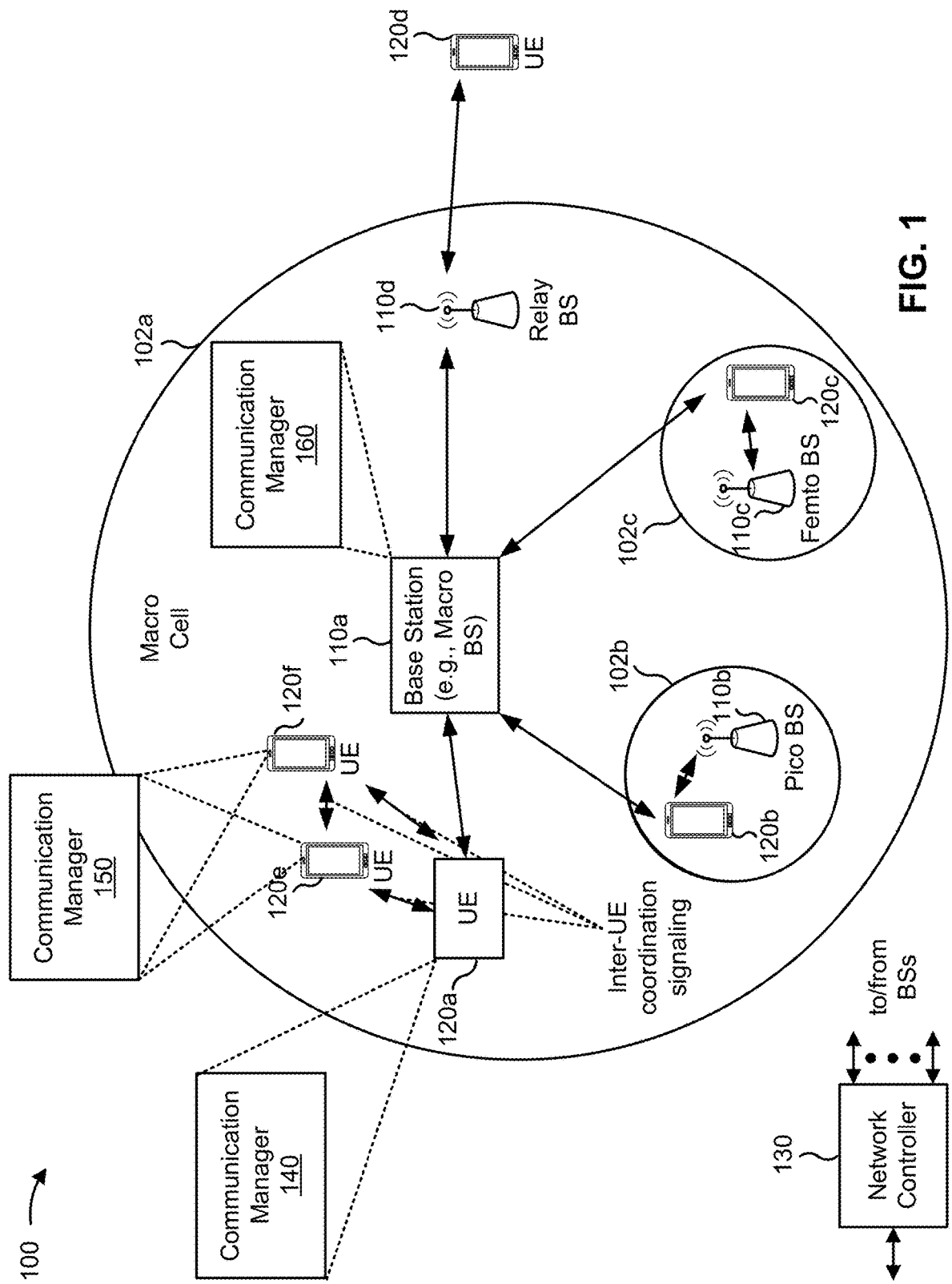
FIG. 1 is a diagram illustrating an example of a wireless network, in accordance with the present disclosure.

A UE engaged in device-to-device communication, such as sidelink communication, may be configured with resources that are to be used to transmit device-to-device coordination messages, such as sidelink inter-UE coordination information messages. For example, a first UE may receive, from a second UE and a third UE, a request for a sidelink inter-UE coordination message. The UE may perform resource sensing to determine whether resources are available and may transmit the sidelink inter-UE coordination message to the second UE and the third UE to identify reserved resources and available resources in a selection window. In one or more examples, the second UE and the third UE may each use the sidelink inter-UE coordination message to determine whether to transmit in one or more resources of the selection window. When the first UE is performing sensing, the first UE may detect a resource reservation from the second UE or from the third UE.

Some aspects described herein enable indication of whether resources are available in a selection window in cases where a UE, that has requested a device-to-device coordination message, is the same UE that has attempted to reserve resources in the selection window. For example, a first UE may use separate device-to-device coordination messages for a second UE and for a third UE to avoid ambiguity regarding whether a resource is available. Additionally, or alternatively, the first UE may use a single device-to-device coordination message, but may include an indicator that the second UE and the third UE can use to determine whether a resource is reserved by another UE. In this way, UEs may avoid transmitting on resources that have already been reserved by other UEs. Moreover, UEs may accurately identify resources that are available, thereby ensuring efficient utilization of network resources.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

The electromagnetic spectrum is often subdivided, by frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120a may include a communication manager 140. As described in more detail elsewhere herein, the communication manager 140 may determine whether a resource is available for use by one or more other UEs (such as UEs 120e or 120f); and transmit a device-to-device coordination message to indicate whether the resource is available for use by the one or more other UEs. Additionally, or alternatively, the communication manager 140 may perform one or more other operations described herein.

In some aspects, the UEs 120 and 120f may include a communication manager 150. As described in more detail elsewhere herein, the communication manager 150 may receive a device-to-device coordination message indicating whether a resource is available for use by one or more UEs; and determine whether the resource is available for use by the UE based at least in part on the device-to-device coordination message. Additionally, or alternatively, the communication manager 150 may perform one or more other operations described herein.

In some aspects, the base station 110a may include a communication manager 160. As described in more detail elsewhere herein, the communication manager 160 may receive first signaling identifying a UE as configured for device-to-device communication; and may transmit second signaling indicating a configuration for a device-to-device coordination message associated with an identification of available resources for device-to-device communication. Additionally, or alternatively, the communication manager 160 may perform one or more other operations described herein.

As indicated above, FIG. 1 is provided as an example. Other examples may differ from what is described with regard to FIG. 1.

Figure 2:
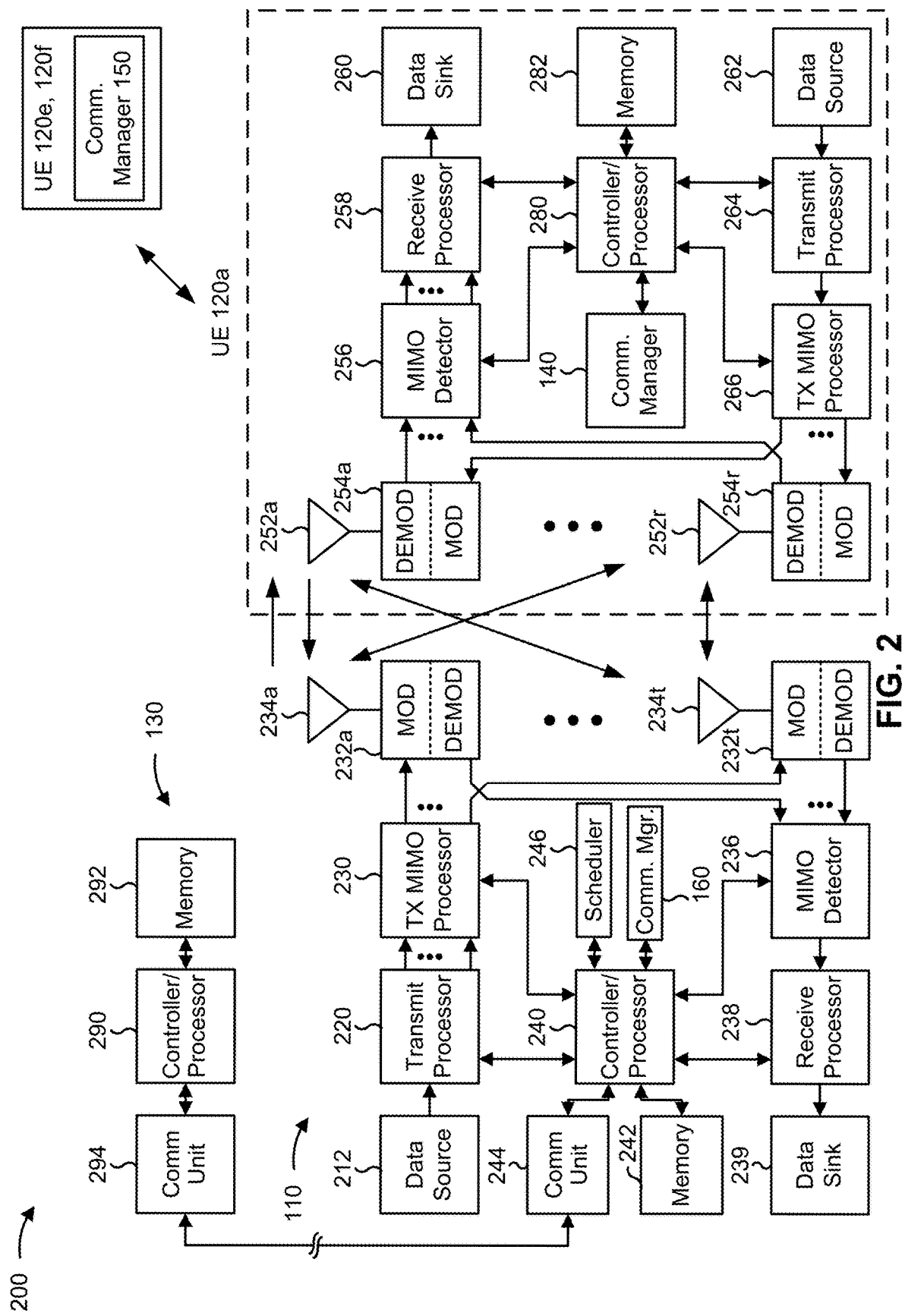
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers or one or more processors. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein.

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein.

The controller/processor 240 of the base station 110, the controller/processor 280 of the UE 120, and/or any other component(s) of FIG. 2 may perform one or more techniques associated with resource indication for device-to-device coordination, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a UE 120 (such as the UE 120a) includes means for determining whether a resource is available for use by one or more other UEs; and/or means for transmitting a device-to-device coordination message to indicate whether the resource is available for use by the one or more other UEs. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE 120 (such as the UEs 120e or 120f) includes means for receiving a device-to-device coordination message indicating whether a resource is available for use by one or more UEs; and/or means for determining whether the resource is available for use by the UE based at least in part on the device-to-device coordination message. The means for the UE to perform operations described herein may include, for example, one or more of communication manager 150, antenna 252, modem 254, MIMO detector 256, receive processor 258, transmit processor 264, TX MIMO processor 266, controller/processor 280, or memory 282.

In some aspects, a base station 110 (such as the base station 110a) includes means for receiving first signaling identifying a UE as configured for device-to-device communication; and/or means for transmitting second signaling indicating a configuration for a device-to-device coordination message associated with an identification of available resources for device-to-device communication. The means for the base station to perform operations described herein may include, for example, one or more of communication manager 160, antenna 234, modem 232, MIMO detector 236, receive processor 238, transmit processor 220, TX MIMO processor 230, controller/processor 240, or memory 242.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
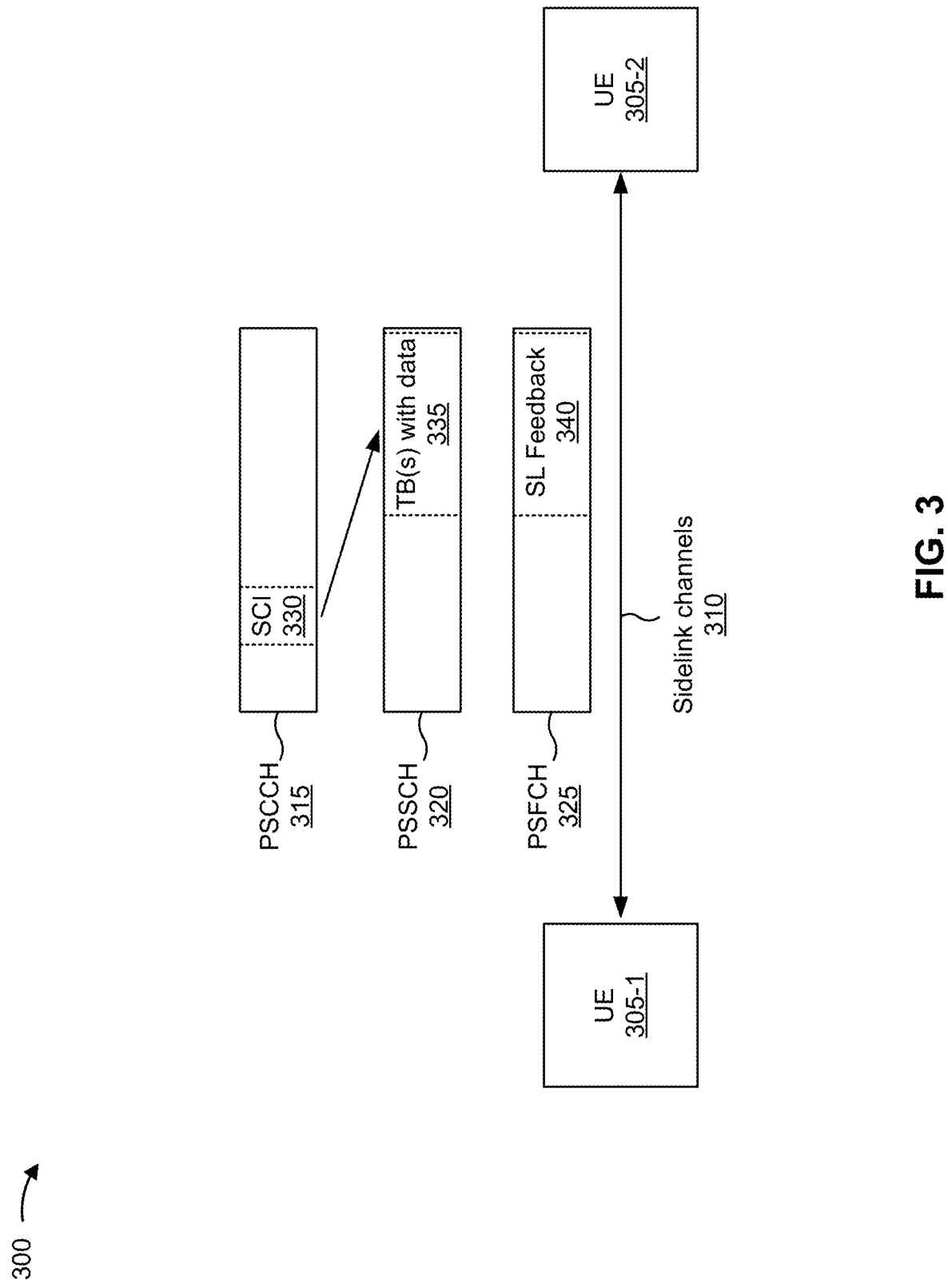
FIG. 3 is a diagram illustrating an example of device-to-device communications, in accordance with the present disclosure.

FIG. 3 is a diagram illustrating an example 300 of device-to-device communications, in accordance with the present disclosure.

As shown in FIG. 3, a first UE 305-1, which may correspond to UE 120a, may communicate with a second UE 305-2, which may correspond to UE 120e, (and one or more other UEs 305) via one or more sidelink channels 310, which may be an example of device-to-device communications. The UEs 305-1 and 305-2 may communicate using the one or more sidelink channels 310 for P2P communications, D2D communications, V2X communications (e.g., which may include V2V communications, vehicle to infrastructure (V2I) communications, vehicle to pedestrian (V2P) communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
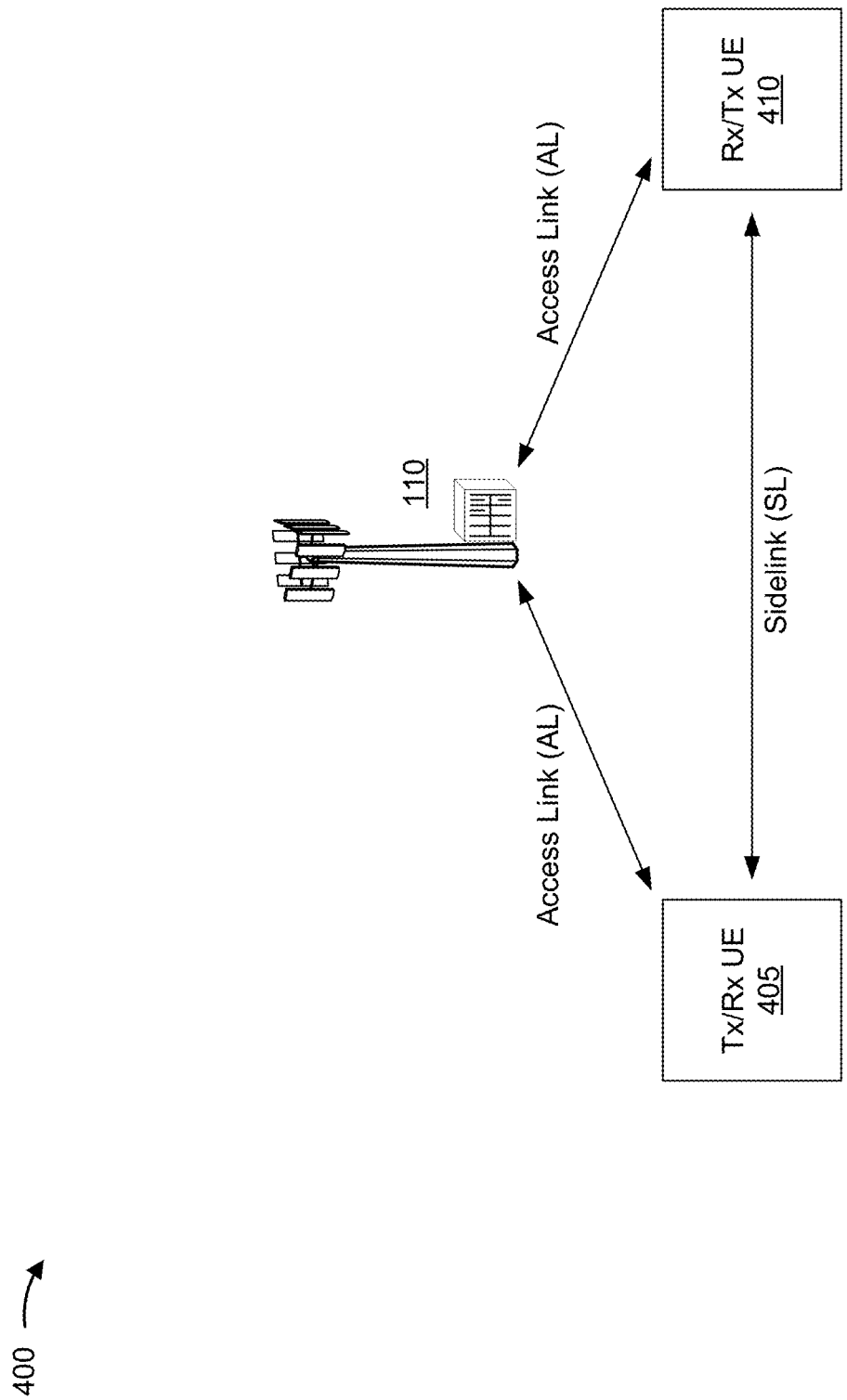
FIG. 4 is a diagram illustrating an example of device-to-device communications and access link communications, in accordance with the present disclosure.

FIG. 4 is a diagram illustrating an example 400 of device-to-device communications and access link communications, in accordance with the present disclosure.

As shown in FIG. 4, a transmitter (Tx)/receiver (Rx) UE 405, which may correspond to UE 120a, and an Rx/Tx UE 410, which may correspond to UE 120e, may communicate with one another via a sidelink, which may be an example of a device-to-device link, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5A:
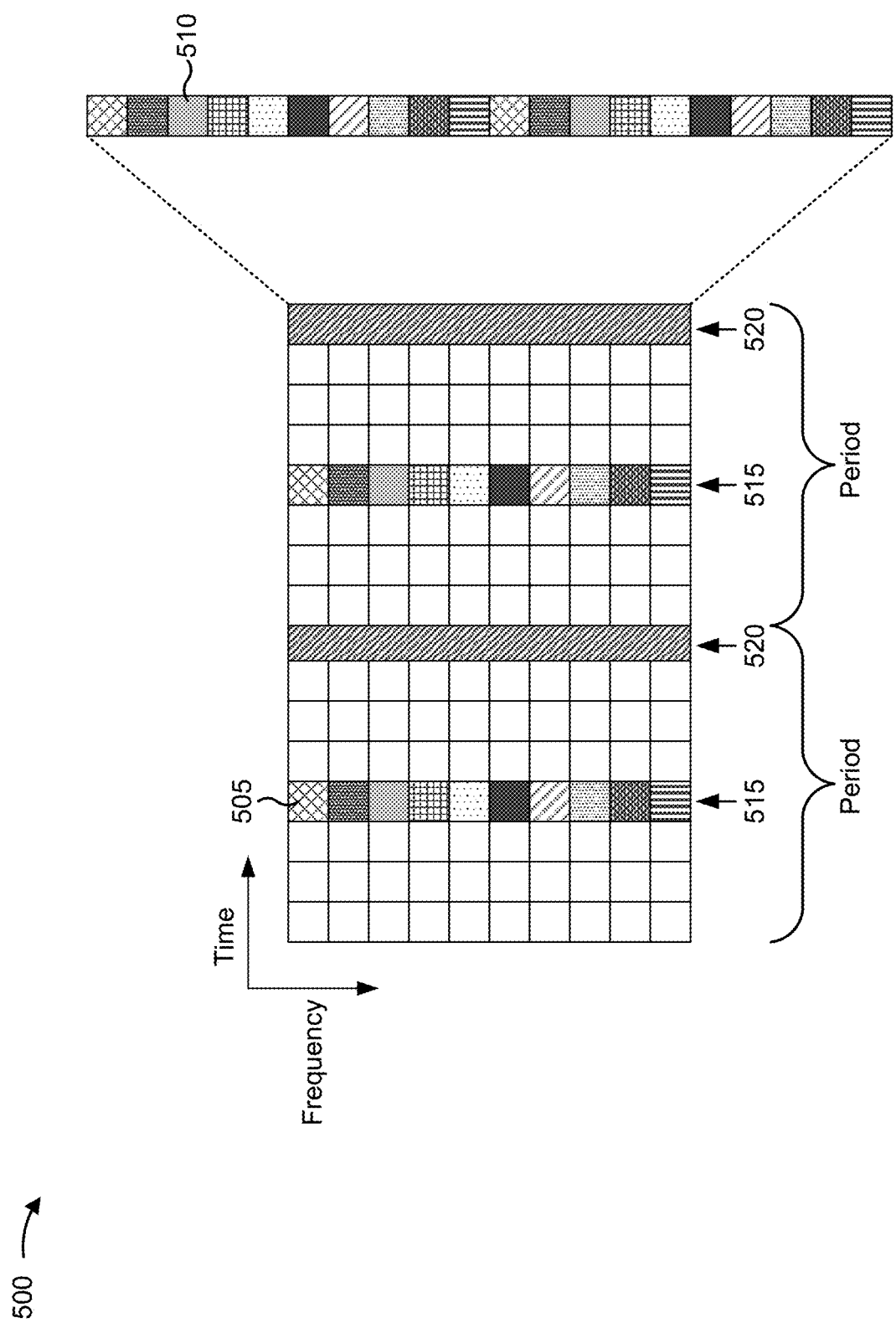
FIGS. 5A and 5B are diagrams illustrating examples of requesting and reporting resources for sidelink inter-UE coordination information, in accordance with the present disclosure.
Figure 5B:
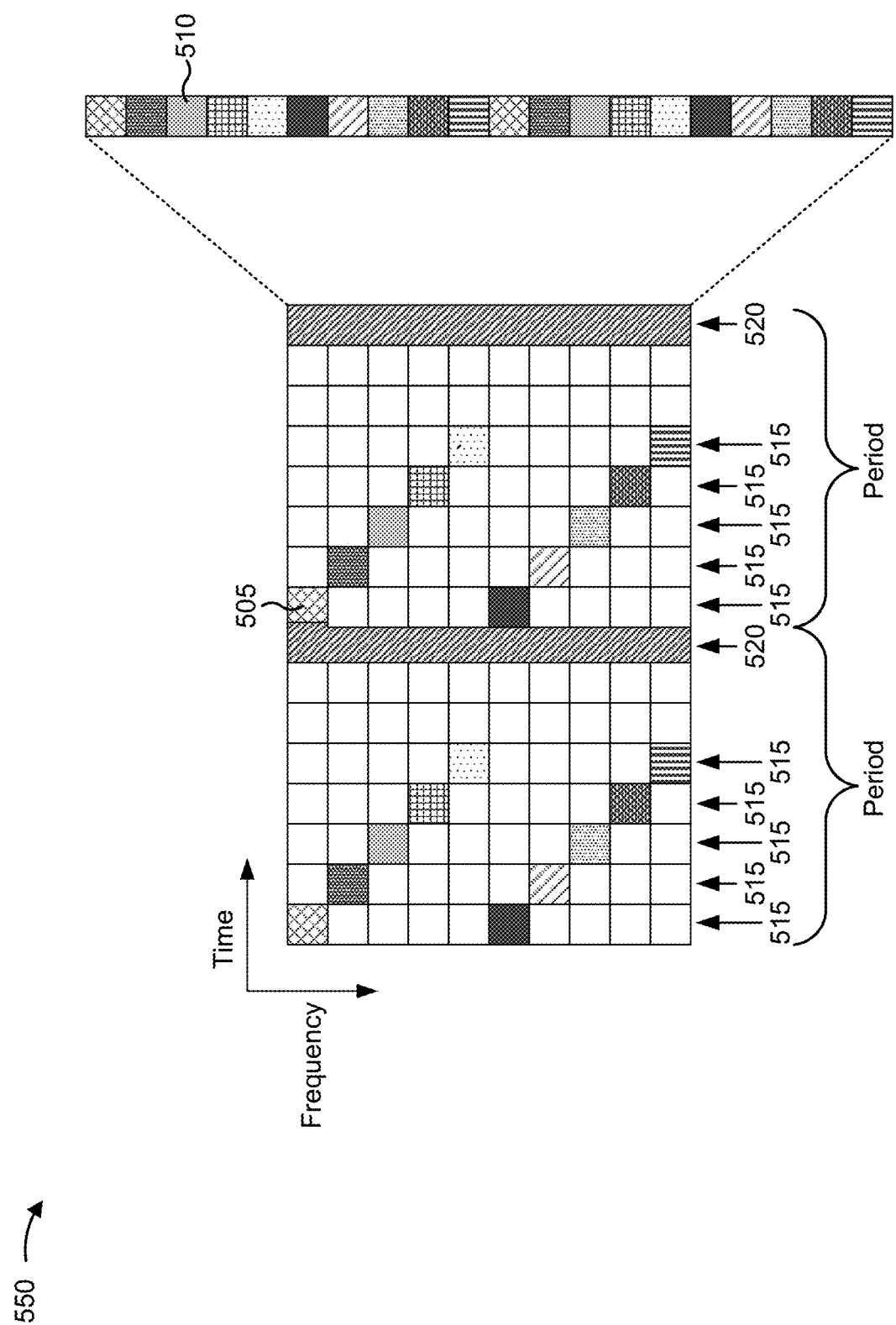

FIGS. 5A and 5B are diagrams illustrating examples 500 and 550 of requesting and reporting resources for sidelink inter-UE coordination information, in accordance with the present disclosure.

A UE engaged in device-to-device communication, such as sidelink communication, may be configured with resources 505 that are to be used to transmit and/or receive requests for sidelink inter-UE coordination information (which may be referred to as requesting resources), and/or resources 510 that are to be used to transmit and/or receive reports of sidelink inter-UE coordination information (which may be referred to as reporting resources). A requesting resource 505 or a reporting resource 510 may include one or more sub-channels (e.g., of a sidelink resource pool) in a frequency domain and one slot in a time domain; however, other configurations are possible. In some aspects, a reporting resource 510 and a requesting resource 505 may differ in size in a frequency domain and/or in a time domain.

The requesting resources 505 and the reporting resources 510 may be configured with a particular periodicity (e.g., the requesting resources 505 and the reporting resources 510 may be configured with the same periodicity or different periodicities). Each periodic occasion of the requesting resources 505 may be referred to as a requesting occasion 515, and each periodic occasion of the reporting resources 510 may be referred to as a reporting occasion 520. The reporting occasions 520 on the right side of FIGS. 5A and 5B are shown enlarged to illustrate the reporting resources 510.

In some aspects, if inter-UE coordination information is requested in a particular requesting occasion 515, then responsive inter-UE coordination information may be reported in the next reporting occasion 520 following the particular requesting occasion 515. That is, a requesting occasion 515 may be associated with a reporting occasion 520 that is to be used for responding to a request for inter-UE coordination information that was transmitted in the requesting occasion 515.

In some aspects, a requesting resource 505 may be mapped to one or more reporting resources 510. For example, in the examples 500 and 550, a requesting resource 505 shown with a particular fill may be mapped to one or more reporting resources 510 shown in the same fill. A UE may be configured with a mapping between requesting resources 505 and reporting resources 510, such as in a sidelink resource pool configuration. The mapping may indicate particular reporting resource(s) 510 that are to be used for responding to a request for inter-UE coordination information that was transmitted in a particular requesting resource 505 (e.g., according to a mapping between the particular requesting resource 505 and the particular reporting resource(s) 510).

In the example 500, the requesting resources 505 may be in a single requesting occasion 515 per period. That is, the requesting resources 505 may be in a single sidelink slot per period. In one or more examples, the single requesting occasion 515 may be associated with a single reporting occasion 520 per period.

In the example 550, the requesting resources 505 may be distributed over multiple requesting occasions 515 per period. That is, the requesting resources 505 may be in multiple slots per period. In one or more examples, the multiple requesting occasions 515 may be associated with a single reporting occasion 520 per period.

As indicated above, FIGS. 5A and 5B are provided as examples. Other examples may differ from what is described with respect to FIGS. 5A and 5B.

Figure 6:
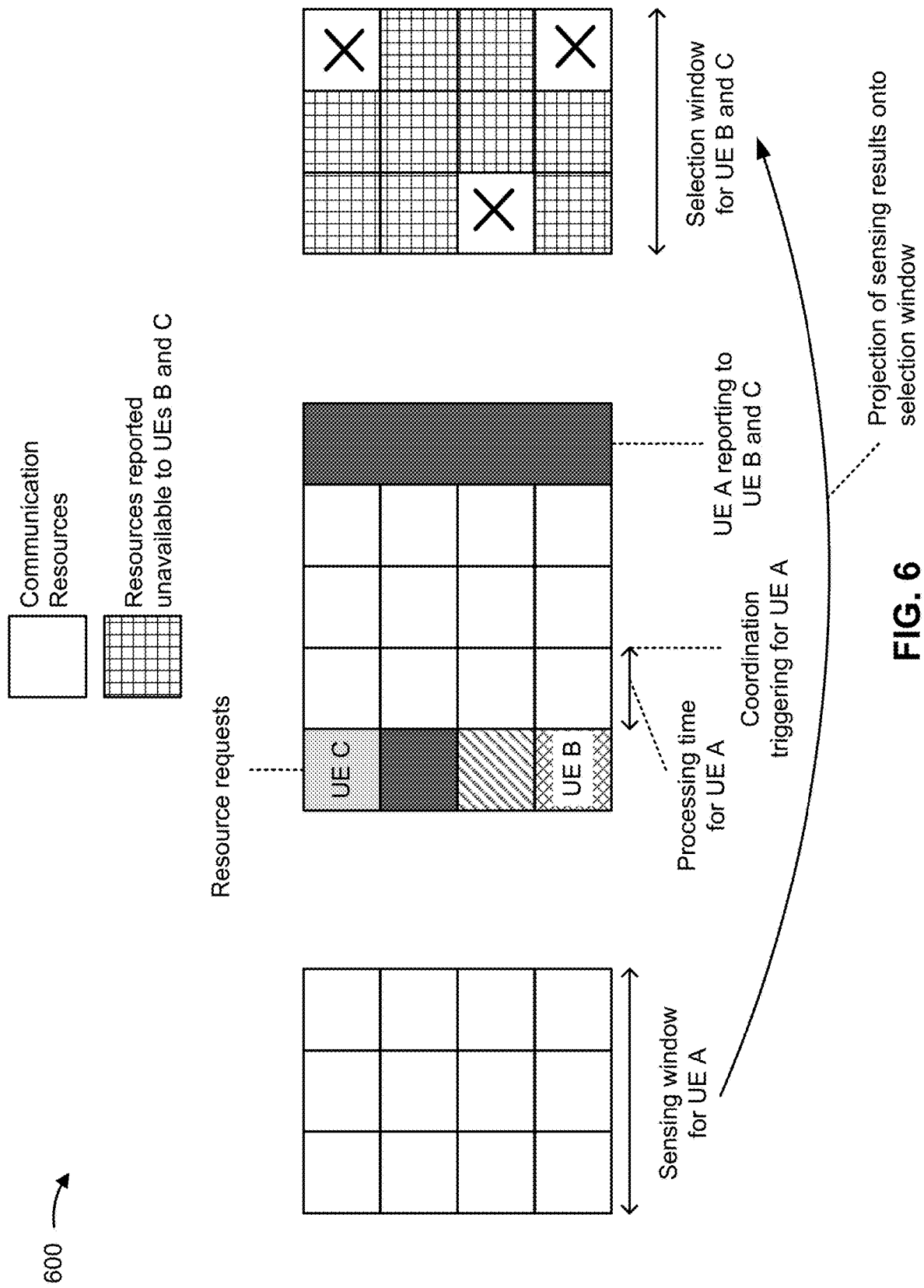
FIG. 6 is a diagram illustrating an example of resource sensing for sidelink inter-UE coordination, in accordance with the present disclosure.

FIG. 6 is a diagram illustrating an example 600 of resource sensing for sidelink inter-UE coordination, in accordance with the present disclosure.

As shown in FIG. 6, during a sensing window, a UE A (which may correspond to, for example, UE 120a) may coordinate with other UEs, such as a UE B (which may correspond to, for example, UE 120e) and a UE C (which may correspond to, for example, UE 120f). For example, UEs B and C may request assistance from UE A in determining whether resources are available for communication. In another example, UE A may receive a request from a BS or a relay BS to assist with inter-UE coordination. In yet another example, UE A may autonomously determine to transmit an inter-UE coordination message, such as based at least in part on observed network conditions.

UE A may, during a sensing window, monitor for resource availability. The UE A may detect a request for resources from, for example, UE B, UE C, and other UEs. In some cases, UE A may experience a processing delay between when UE A detects a request for resources and when UE A has processed the request and is triggered to transmit an inter-UE coordination message to identify whether resources are available.

As further shown in FIG. 6, UE A may transmit reporting regarding whether resources are available to UE B, UE C, and/or other UEs. The transmission of the reporting may occur a threshold processing time before a selection window during which UE A, UE B, UE C, and other UEs may use resources that UE A has identified as available or unavailable. For example, as shown, UE A identifies one or more resources as available to UE B and UE C and other resources as unavailable to UE B and U C.

As indicated above, FIG. 6 is provided as an example. Other examples may differ from what is described with respect to FIG. 6.

Figure 7:
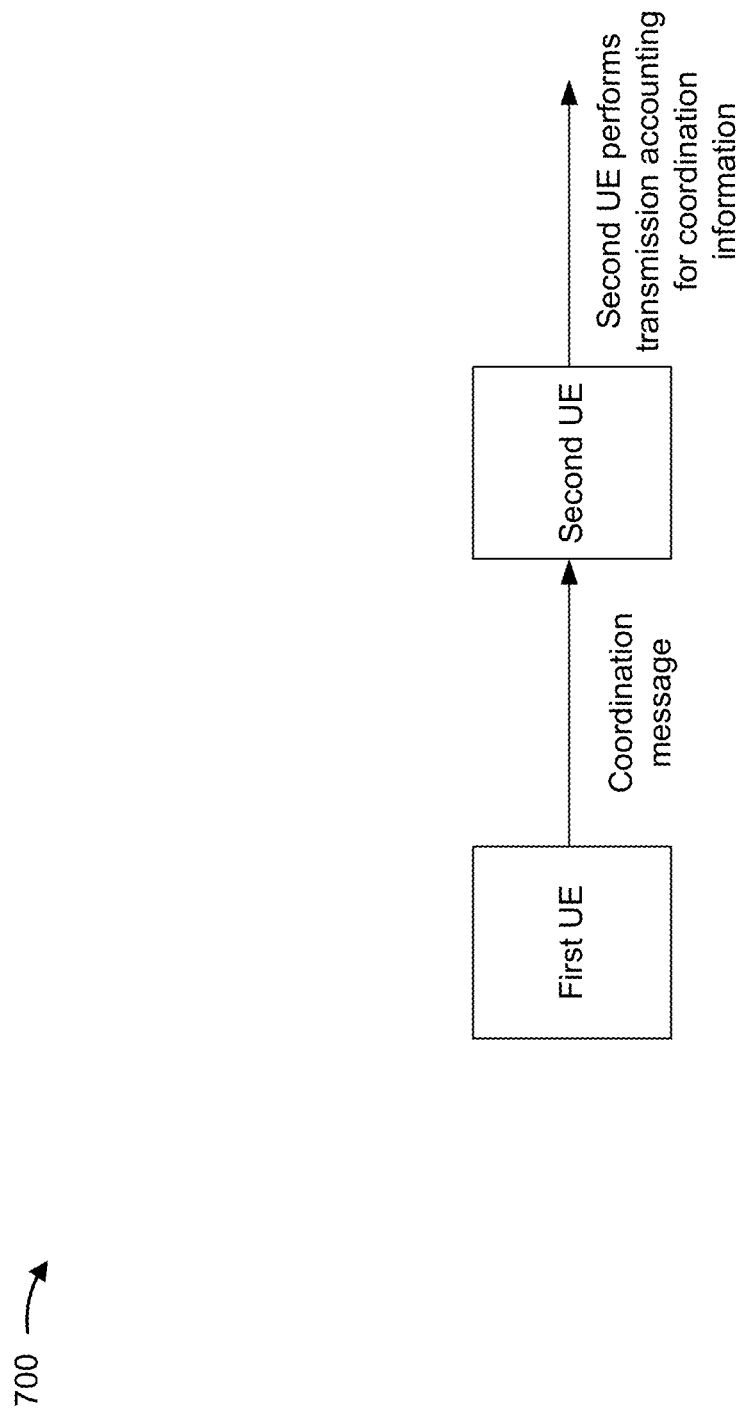
FIG. 7 is a diagram illustrating an example associated with coordination signaling, in accordance with the present disclosure.

FIG. 7 is a diagram illustrating an example 700 of coordination signaling, in accordance with the present disclosure.

In example 700, a first UE (e.g., UE 120*a*) exchanges inter-UE coordination signaling with a second UE (e.g., UE 120*e*). The first UE and the second UE may operate in an in-coverage mode, a partial coverage mode, an out-of-coverage mode, and/or the like. For example, the first UE may determine a set of sidelink resources available for a resource allocation. The first UE may determine the set of sidelink resources based at least in part on determining that the set of sidelink resources are to be selected, or based at least in part on a request, referred to herein as an inter-UE coordination request, received from the second UE or a base station. In some aspects, the first UE may determine the set of sidelink resources based at least in part on a sensing operation, which may be performed before receiving an inter-UE coordination request or after receiving the inter-UE coordination request. The first UE may transmit the set of available resources to the second UE via inter-UE coordination signaling (shown as a coordination message, and which may be referred to as an inter-UE coordination message). The first UE may transmit the set of available resources using an NR sidelink resource allocation mode 2. In the NR sidelink resource allocation mode 2, resource allocation is handled by UEs (e.g., in comparison to an NR sidelink resource allocation mode 1, in which resource allocation is handled by a scheduling entity such as a base station). The second UE may select a sidelink resource for a transmission from the second UE based at least in part on the set of available resources received from the first UE. As shown, the second UE may perform the transmission accounting for the coordination information (e.g., via a sidelink resource indicated by the inter-UE coordination message, and/or the like). Inter-UE coordination signaling related to resource allocation may reduce collisions between the first UE and the second UE. Inter-UE coordination signaling related to resource allocation may reduce a power consumption for the first UE and/or the second UE.

As indicated above, FIG. 7 is provided as an example. Other examples may differ from what is described with respect to FIG. 7.

As described above, a first UE may perform sensing to determine whether resources are available to a second UE and/or a third UE in a selection window. During the sensing, the first UE may detect that the second UE and/or the third UE has reserved some of the resources in the selection window. In other words, the same UEs that are requesting information regarding resource availability may have attempted to reserve resources. For example, the second UE may transmit a sidelink control information (SCI) during a sensing window to reserve resources in a selection window, and the first UE may detect the SCI.

Some aspects described herein provide techniques for indicating resource reservation in scenarios where the same UEs that have requested information regarding resource availability have also reserved resources. For example, the first UE may transmit a first device-to-device coordination message to the second UE indicating that resources reserved by the second UE are available (to the second UE) and may transmit a second device-to-device coordination message to the third UE indicating that the resources reserved by the second UE are not available (to the third UE). Additionally, or alternatively, the first UE may transmit a single device-to-device coordination message that includes an indicator of which UE reserved resources to enable the second UE and the third UE to resolve whether the resources reserved by the second UE are available. In this way, the UEs enable device-to-device coordination, thereby avoiding transmitting using resources that are already reserved by other UEs.

Figure 8B:
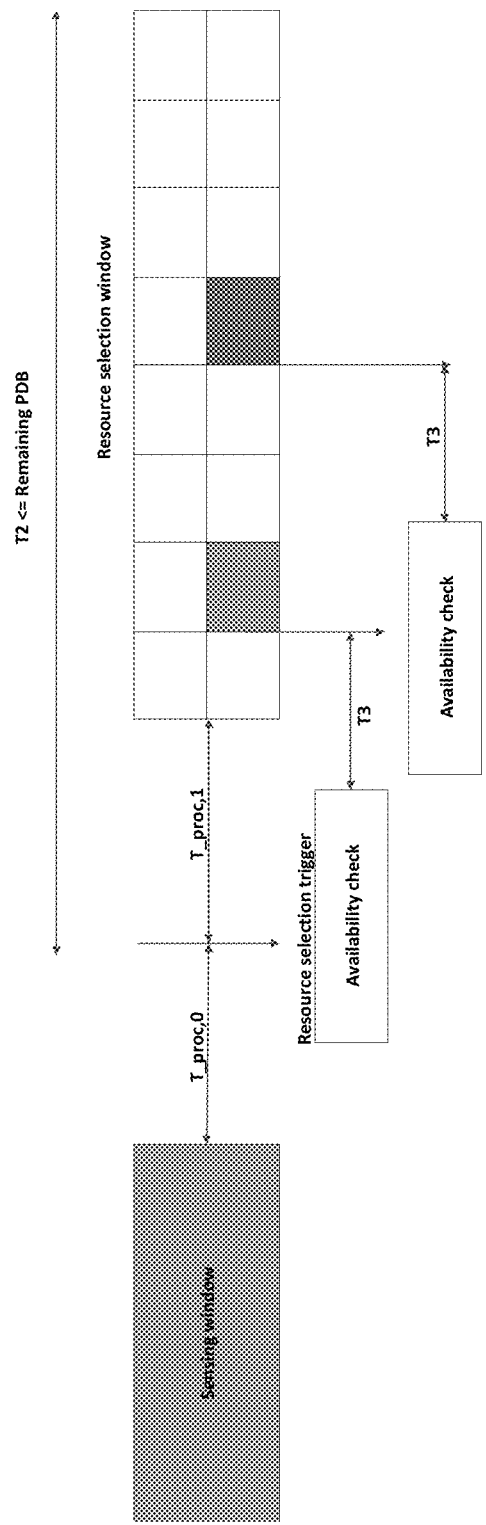

FIGS. 8A and 8B are diagrams illustrating an example 800 associated with resource indication for device-to-device coordination, in accordance with the present disclosure. As shown in FIG. 8A, example 800 includes communications between a group of UEs 120, such as a UE 120*a*, a UE 120*e*, and a UE 120*f*. In some aspects, the UEs 120 may be included in a wireless network, such as wireless network 100. The UEs 120 may communicate on device-to-device links, which may include a sidelink.

As further shown in FIG. 8A, and by reference number 810, UE 120*a* may receive information associated with (e.g., a request for or a configuration for) a device-to-device coordination message. For example, UE 120*a* may receive a request for an inter-UE coordination message. Additionally, or alternatively, UE 120*a* may receive information identifying a configuration of the device-to-device coordination message (e.g., a periodicity parameter) and may transmit the device-to-device coordination message in accordance with the configuration. For example, the periodicity parameter may indicate a periodicity at which UE 120*a* is scheduled to transmit the device-to-device coordination message to UEs 120*e* and 120*f* and/or other UEs.

In some aspects, UE 120*a* may receive the request before the start of a sensing window. For example, UE 120*a* may receive a first request from UE 120*e* and a second request from UE 120*f* before the start of a sensing window. In one or more examples, UE 120*a* may perform resource sensing during the sensing window to enable generation of a device-to-device coordination message identifying available resources to UEs 120*e* and 120*f*. In some aspects, UE 120*a* may receive the request for the device-to-device coordination message from another device, such as from a BS 110. In some aspects, a base station 110 (not shown) may configure the device-to-device coordination message. For example, a base station 110 may receive first signaling indicating that a UE, such as the UE 120*a*, the UE 120*e*, or the UE 120*f*, is configured for device-to-device communication and may transmit signaling to the UE to indicate the configuration for device-to-device coordination messages. Additionally, or alternatively, the UE may have the configuration for the device-to-device configuration message stored (hard-coded) in a memory.

As further shown in FIG. 8A, and by reference number 820, UE 120*a* may perform resource sensing. For example, as described above, UE 120*a* may monitor resource utilization during a sensing window to predict a resource utilization during a selection window. In some aspects, UE 120*a* may detect a resource reservation during monitoring of the sensing window. For example, UE 120*a* may detect, during monitoring of the sensing window, an SCI from UE 120*e* indicating an attempt to reserve resources in the selection window. Additionally, or alternatively, UE 120*a* may detect an SCI from UE 120*f*, SCIs from both UE 120*e* and 120*f*, an SCI from another UE 120, and/or the like.

As further shown in FIG. 8A, and by reference numbers 830 and 840, UE 120*a* may transmit a device-to-device coordination message and UEs 120*e* and 120*f* may determine a resource availability for transmission based at least in part on the device-to-device coordination message. UE 120*a* may transmit the device-to-device coordination message in response to or based at least in part on the request for the device-to-device coordination message. Additionally, or alternatively, UE 120*a* may transmit the device-to-device coordination message based at least in part on the configuration of the device-to-device coordination message. For example, UE 120*a* may transmit the device-to-device coordination message at times or a periodicity indicated by the periodicity parameter. In some aspects, UE 120*a* may transmit an inter-UE coordination message identifying a resource availability in the selection window, and UE 120*e* may interpret the inter-UE coordination message to determine whether a resource is available or unavailable. In some aspects, UE 120*a* may transmit a plurality of different inter-UE coordination messages. For example, UE 120*a* may transmit a first inter-UE coordination message to UE 120*e* and a second inter-UE coordination message to UE 120*f*. In this example, when UE 120*a* has detected a resource reservation of a particular resource by UE 120*e*, UE 120*a* may report the particular resource as available to UE 120*e* in the first inter-UE coordination message. Further to the example, UE 120*a* may report the particular resource as unavailable to UE 120*f* in the second inter-UE coordination message. In this way, UE 120*a* enables utilization of the particular resource by UE 120*e* without interference from UE 120*f*.

In some aspects, UE 120*a* may transmit a single inter-UE coordination message to both UE 120*e* and 120*f*. For example, UE 120*a* may transmit the same inter-UE coordination message to both UE 120*e* and 120*f*. Further to the example, when UE 120*a* has detected a resource reservation of a particular resource by UE 120*e*, UE 120*a* may report the particular resource as unavailable in the single inter-UE coordination message. As a result, UE 120*f* may determine that the particular resource is unavailable, but UE 120*e*, which reserved the particular resource, may determine that the particular resource is actually available. In this way, UE 120*a* enables utilization of the particular resource by UE 120*e* without interference from UE 120*f*.

In another example, UE 120*a* may detect resource reservations from other UEs 120 as well as from UE 120*f*. As a result, indicating that the particular resource is unavailable may resolve ambiguously, as UE 120*e* may not be able to determine whether UE 120*e* is the only resource that has attempted to reserve the particular resource. Thus, in some aspects, UE 120*a* may include an indicator of a UE that reserved an unavailable resource. For example, UE 120*a* may include, for each resource marked as unavailable, an identifier of a UE that reserved the respective resource. Returning to the aforementioned example, if UE 120*e* and another UE 120 attempt to reserve the particular resource, UE 120*a* may include identifiers of both UE 120*e* and the other UE, which may enable the UE 120*e* to determine that the particular resource is unavailable (or is available only after using a contention-based access procedure).

Additionally, or alternatively, UE 120*a* may include an identifier of only the other UE 120, which is not to receive an inter-UE coordination message, thereby enabling UEs that are receiving the inter-UE coordination message (e.g., UEs 120*e* and 120*f*) to determine that the particular resource is unavailable to each UE that is receiving the inter-UE coordination message.

In some aspects, UE 120*a* may include a bit indicator rather than a UE identifier to indicate whether a particular resource is available to a UE that is to receive the inter-UE coordination message. For example, UE 120*a* may set the bit indicator to a particular value to indicate information regarding an availability of the particular resource. In some aspects, UE 120*a* may provide an index in connection with the inter-UE coordination message (e.g., an index value included in the inter-UE coordination message or transmitted separately) that indicates to UEs 120*e/f* that a 2-bit indication is included as payload in the inter-UE coordination message (e.g., and may enable UEs 120*e/f* to decode the 2-bit indication payload). As a particular example of a set of bit indicator values, for a two-bit indicator, UE 120*a* may use a value of '00' to indicate that the particular resource is unavailable to UEs that have requested the inter-UE coordination message (e.g., the particular resource is reserved by the other UE 120, as described above). Further to the example, UE 120*a* may use a value of '10' to indicate that the particular resource is available for a first requesting UE (e.g., UE 120*e*), but that a second requesting UE (e.g., UE 120*f*) has also attempted to reserve the particular resource. Further to the example, UE 120*a* may use a value of '11' to indicate that the particular resource is available.

Further to the example, UE 120*a* may use a value of '01' to indicate that the particular resource is unavailable except to a requesting UE that has reserved the particular resource (e.g., UE 120*e*). In one or more examples, UE 120*e* and 120*f* may attempt to use the particular resource (without causing a collision) for transmission. For example, when passing information identifying available resources to an upper layer for processing, UE 120*e* may perform a random selection procedure to select an available resource. Further to the example, UE 120*e* may weight resources marked as available for the requesting UE but subject to a resource reservation by another UE lower than other resources, thereby reducing a likelihood that UE 120*e* (and other UEs similarly weighting the particular resource) select the particular resource and transmit, which may cause a collision.

Additionally, or alternatively, as shown in FIG. 8B, before transmission, UE 120*e* may perform an availability check on the particular resource. For example, after selecting the particular resource, UE 120*e* may monitor the particular resource to determine whether the particular resource is to be used by another UE 120 (e.g., UE 120*f*) and may use the particular resource if UE 120*e* determines that the particular resource is not being used. Additionally, or alternatively, UE 120*e* may receive an SCI at another time and use the SCI to determine whether the particular resource is available. In some cases, UE 120*e* may determine that the particular resource is available for use based at least in part on a UE implementation. For example, in a first implementation, UE 120*e* may attempt to detect an SCI reserving a resource and may consider the resource unavailable even when an SCI is not detected. In a second implementation, UE 120*e* may consider the resource available when an SCI is not detected. In some aspects, if UE 120*e* detects a reservation by UE 120*f*, UE 120*e* may preempt transmission on the particular resource and select another resource for transmission.

Although described herein in terms of a particular set of bit indicators, other bit indicators, arrangements of bit indicators, and/or the like are possible.

As indicated above, FIGS. 8A and 8B are provided as an example. Other examples may differ from what is described with respect to FIGS. 8A and 8B.

Figure 9:
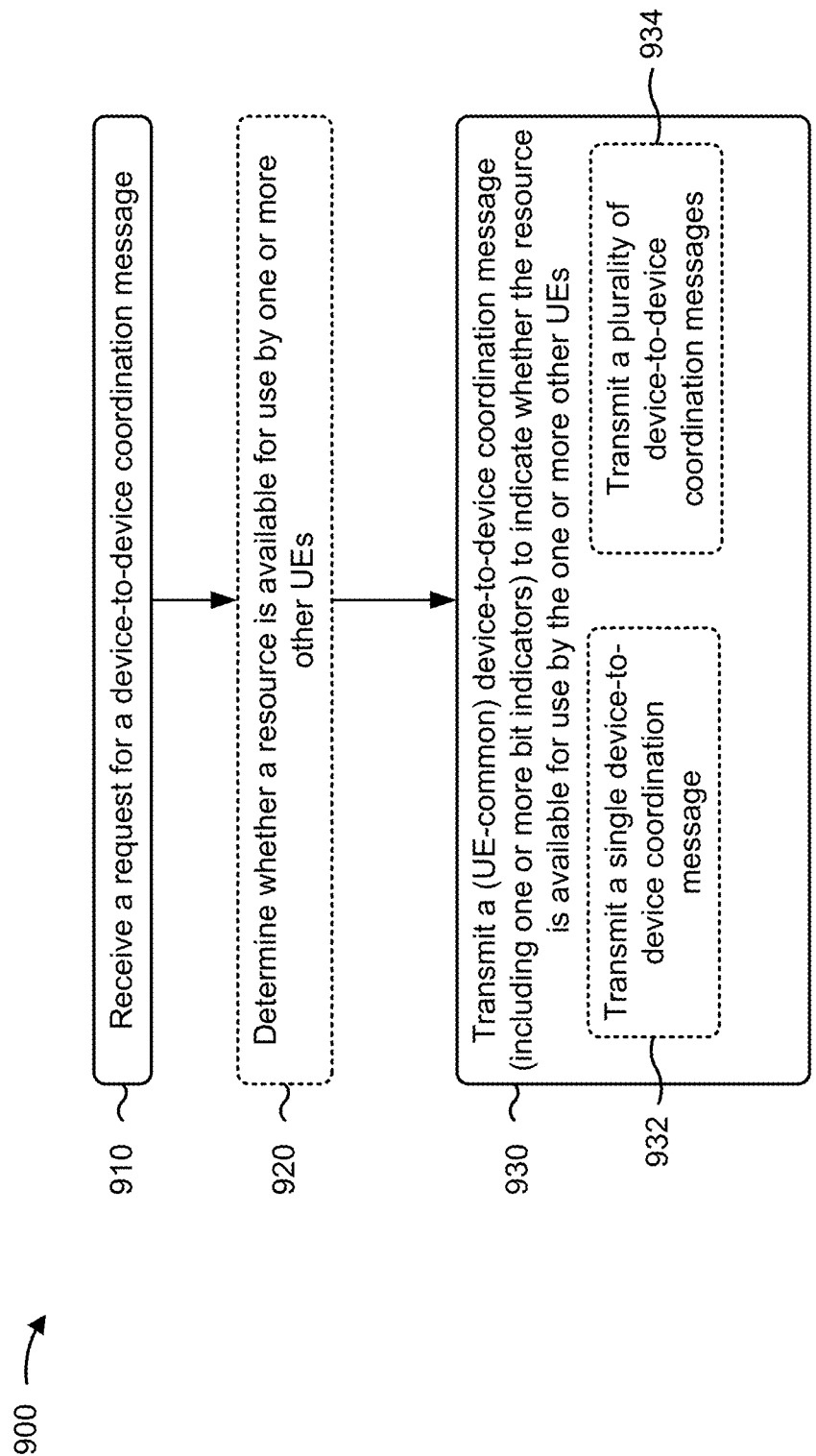
FIGS. 9-10 are diagrams illustrating example processes associated with resource indication for device-to-device coordination, in accordance with the present disclosure.

FIG. 9 is a diagram illustrating an example process 900 performed, for example, by a UE, in accordance with the present disclosure. Example process 900 is an example where the UE (e.g., UE 120) performs operations associated with resource indication for device-to-device coordination.

As shown in FIG. 9, in some aspects, process 900 may include receiving a request for a device-to-device coordination message (block 910). For example, the UE (e.g., using reception component 1102 depicted in FIG. 11) may receive the request for the device-to-device coordination message, as described above.

As further shown in FIG. 9, in some aspects, process 900 may include determining whether a resource is available for use by one or more other UEs (block 920). For example, the UE (e.g., using determination component 1108 depicted in FIG. 11) may determine whether a resource is available for use by one or more other UEs, as described above.

As further shown in FIG. 9, in some aspects, process 900 may include transmitting a (UE-common) device-to-device coordination message (including one or more bit indicators) to indicate whether the resource is available for use by the one or more other UEs (block 930). For example, the UE (e.g., using transmission component 1104 depicted in FIG. 11) may transmit a device-to-device coordination message to indicate whether the resource is available for use by the one or more other UEs, as described above. In some aspects, the device-to-device coordination message is a UE-common device-to-device coordination message. A UE-common message, such as a UE-common device-to-device coordination message, may refer to a message that may be received by multiple UEs; in contrast, a UE-specific message may be configured to be received by a specific UE. For example, the UE may transmit a UE-common device-to-device coordination message to provide coordination information that is decodable and usable by multiple UEs, rather than by only a specific UE. In some aspects, the UE may transmit the UE-common device-to-device coordination message using different resources (e.g., a different beam) than is used or allocated for UE-specific messages. In some aspects, the coordination message includes one or more bit indicators indicating whether a resource is available to a UE that requested the device-to-device coordination message, among other possible indications.

As further shown in FIG. 9, in some aspects, process 900 may include transmitting a single device-to-device coordination message (block 932). For example, the UE (e.g., using transmission component 1104) may transmit a single device-to-device coordination message to indicate whether the resource is available for use by the one or more other UEs, as described above.

As further shown in FIG. 9, in some aspects, process 900 may include transmitting a plurality of device-to-device coordination messages (block 934). For example, the UE (e.g., using transmission component 1104) may transmit a plurality of device-to-device coordination messages to indicate whether the resource is available for use by the one or more other UEs, as described above.

Process 900 may include additional aspects, such as any single aspect or any combination of aspects described below and/or in connection with one or more other processes described elsewhere herein.

In a first aspect, transmitting the device-to-device coordination message comprises transmitting a first device-to-device coordination message to a first UE of the one or more other UEs, and transmitting a second device-to-device coordination message to a second UE of the one or more other UEs.

In a second aspect, alone or in combination with the first aspect, determining whether the resource is available comprises determining that the first UE has reserved the resource, the first device-to-device coordination message indicates that the resource is available to the first UE, and the second device-to-device coordination message indicates that the resource is unavailable to the second UE.

In a third aspect, alone or in combination with one or more of the first and second aspects, transmitting the device-to-device coordination message comprises transmitting a single device-to-device coordination message to a first UE of the one or more other UEs and to a second UE of the one or more other UEs.

In a fourth aspect, alone or in combination with one or more of the first through third aspects, process 900 includes determining that the first UE has reserved the resource, and the single device-to-device coordination message indicates that the resource is unavailable.

In a fifth aspect, alone or in combination with one or more of the first through fourth aspects, the single device-to-device coordination message includes a set of identifiers of a set of UEs that reserved the resource.

In a sixth aspect, alone or in combination with one or more of the first through fifth aspects, the single device-to-device coordination message includes a bit indicator indicating whether the resource is reserved by at least one of a UE that requested transmission of the single device-to-device coordination message, or a UE other than the UE that requested the transmission of the single device-to-device coordination message.

In a seventh aspect, alone or in combination with one or more of the first through sixth aspects, the single device-to-device coordination message includes a bit indicator indicating whether the resource is at least one of: unavailable to a UE that requested transmission of the single device-to-device coordination message, available to the UE that requested transmission of the single device-to-device coordination message and subject to resource reservation by another UE, available to any UE, or unavailable to any UE except the UE that requested transmission of the single device-to-device coordination message.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
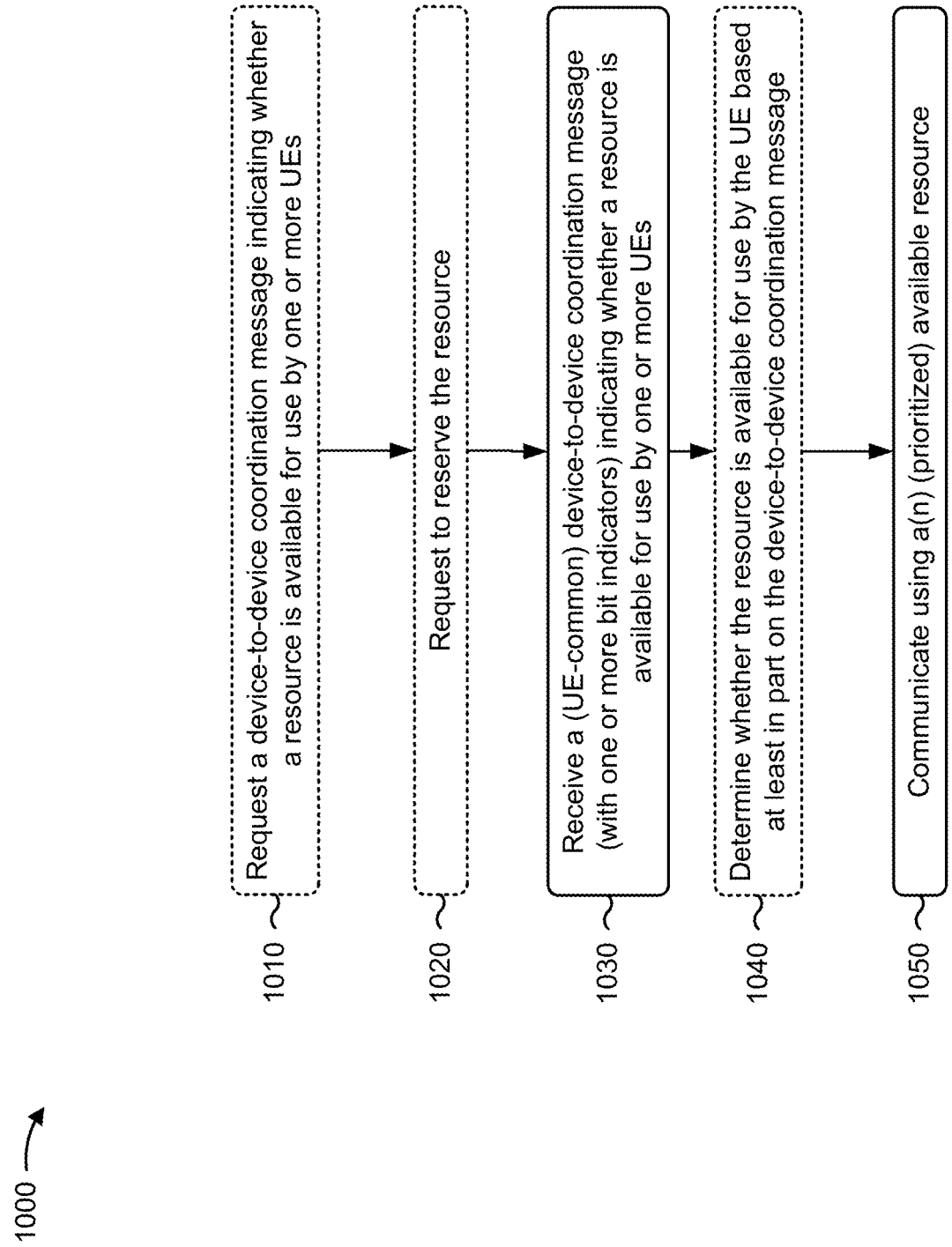

FIG. 10 is a diagram illustrating an example process 1000 performed, for example, by a UE, in accordance with the present disclosure. Example process 1000 is an example where the UE (e.g., UE 120) performs operations associated with resource indication for device-to-device coordination.

As shown in FIG. 10, in some aspects, process 1000 may include requesting a device-to-device coordination message indicating whether a resource is available for use by one or more UEs (block 1010). For example, the UE (e.g., using transmission component 1104) may request a device-to-device coordination message indicating whether a resource is available for use by one or more UEs, as described above.

As further shown in FIG. 10, in some aspects, process 1000 may include requesting to reserve the resource (block 1020). For example, the UE (e.g., using transmission component 1104) may transmit an SCI to attempt to reserve the resource for which the UE has requested the device-to-device coordination message, as described above.

As further shown in FIG. 10, in some aspects, process 1000 may include receiving a (UE-common) device-to-device coordination message (including one or more bit indicators) indicating whether a resource is available for use by one or more UEs (block 1030). For example, the UE (e.g., using reception component 1102) may receive a device-to-device coordination message indicating whether a resource is available for use by one or more UEs, as described above. In some aspects, the device-to-device coordination message may be a UE-common device-to-device coordination message. For example, the UE may transmit the coordination message for decoding and/or use by multiple other UEs, as described above. In some aspects, the coordination message includes one or more bit indicators indicating whether a resource is available to a UE that requested the device-to-device coordination message, among other possible indications.

As further shown in FIG. 10, in some aspects, process 1000 may include determining whether the resource is available for use by the UE based at least in part on the device-to-device coordination message (block 1040). For example, the UE (e.g., using determination component 1108) may determine whether the resource is available for use by the UE based at least in part on the device-to-device coordination message, as described above.

As further shown in FIG. 10, in some aspects, process 1000 may include communicating using a(n) (prioritized) available resource (block 1050). For example, the UE (e.g., using reception component 1102 or transmission component 1104) may communicate using an available resource, as described above. In some aspects, the available resource may be prioritized over other available resources based at least in part on a prioritization included in the device-to-device coordination message.

Process 1000 may include additional aspects, such as any single aspect or any combination of aspects described below and/or in connection with one or more other processes described elsewhere herein.

In a first aspect, the device-to-device coordination message is a UE-specific device-to-device coordination message, and determining whether the resource is available comprises determining whether the resource is available based at least in part on a content of the device-to-device coordination message.

In a second aspect, alone or in combination with the first aspect, receiving the device-to-device coordination message comprises receiving a UE-common device-to-device coordination message transmitted to a plurality of UEs, and determining whether the resource is available comprises determining whether the resource is available based at least in part on a content of the UE-common device-to-device coordination message and whether the UE attempted to reserve the resource.

In a third aspect, alone or in combination with one or more of the first and second aspects, the device-to-device coordination message includes an identifier of a set of UEs that reserved the resource.

In a fourth aspect, alone or in combination with one or more of the first through third aspects, the device-to-device coordination message includes a bit indicator indicating whether the resource is reserved by at least one of a UE that requested transmission of the device-to-device coordination message, or a UE other than the UE that requested the transmission of the device-to-device coordination message.

In a fifth aspect, alone or in combination with one or more of the first through fourth aspects, the device-to-device coordination message includes a bit indicator indicating whether the resource is at least one of: unavailable to a UE that requested transmission of the device-to-device coordination message, available to the UE that requested transmission of the device-to-device coordination message and subject to another resource reservation by another UE, available to any UE, or unavailable to any UE except the UE that requested transmission of the device-to-device coordination message.

In a sixth aspect, alone or in combination with one or more of the first through fifth aspects, process 1000 includes prioritizing the resource for use in transmission based at least in part on a content of the device-to-device coordination message.

In a seventh aspect, alone or in combination with one or more of the first through sixth aspects, determining whether the resource is available comprises performing pre-transmission sensing of whether the resource is available based at least in part on a content of the device-to-device coordination message.

In an eighth aspect, alone or in combination with one or more of the first through seventh aspects, determining whether the resource is available comprises determining whether the resource is available based at least in part on a result of performing pre-transmission sensing and a stored configuration for evaluating the result.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
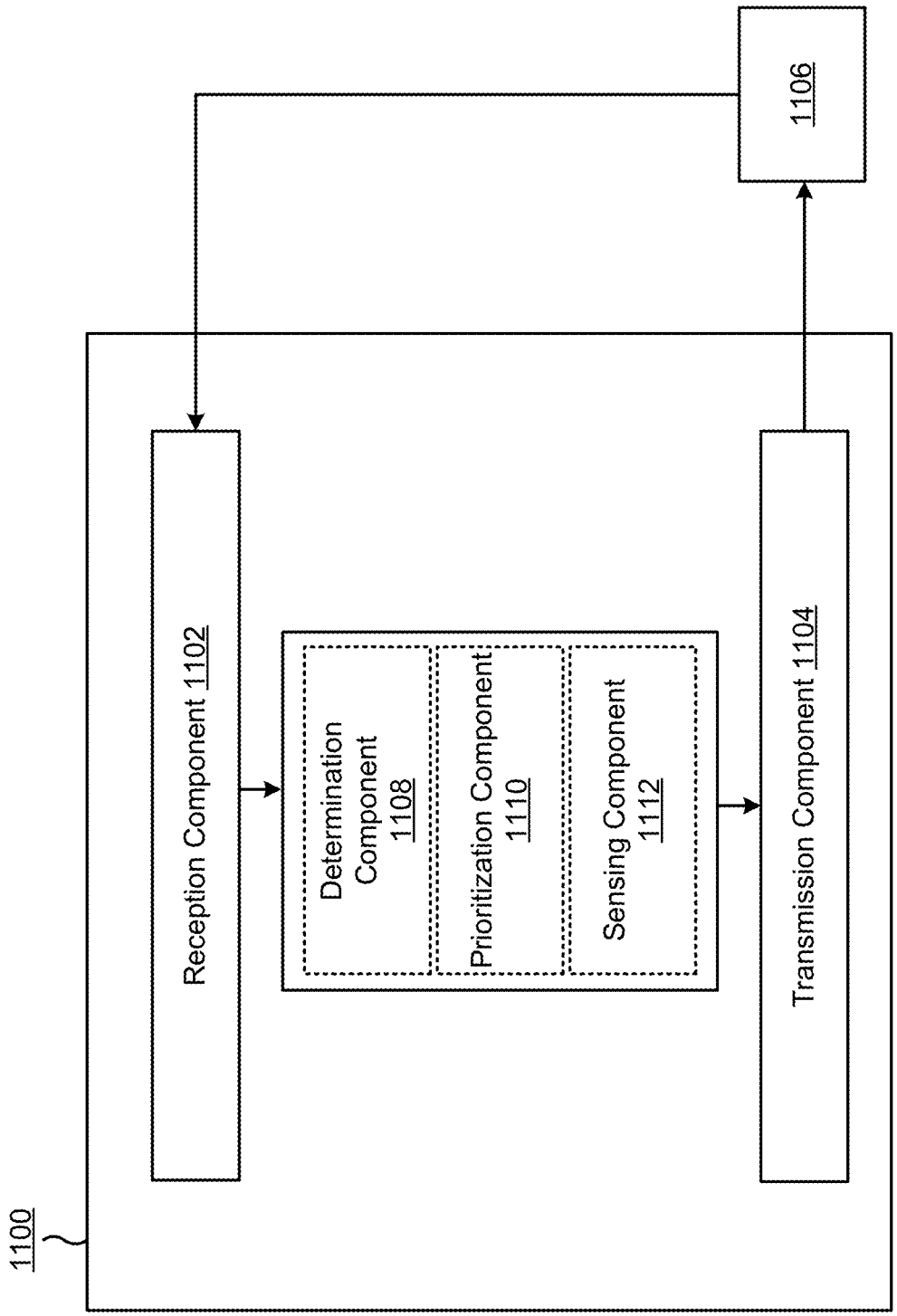
FIG. 11 is a diagram of an example apparatus for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a determination component 1108, a prioritization component 1110, or a sensing component 1112, among other examples.

In some aspects, the apparatus 1100 may be configured to perform one or more operations described herein in connection with FIGS. 8A-8B. Additionally or alternatively, the apparatus 1100 may be configured to perform one or more processes described herein, such as process 900 of FIG. 9 or process 1000 of FIG. 10. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, or data communications, from the apparatus 1106. For example, the reception component 1102 may receive a device-to-device coordination message, an SCI reserving a resource, a request for a device-to-device coordination message, and/or the like. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, or a memory of the UE described above in connection with FIG. 2.

The transmission component 1104 may transmit communications, such as reference signals, control information, or data communications, to the apparatus 1106. For example, the transmission component 1104 may transmit a request to receive a device-to-device coordination message, may transmit an SCI to reserve a resource, may transmit a device-to-device coordination message, and/or the like. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, or a memory, of the UE described above in connection with FIG. 2. In some aspects, the transmission component 1104 may be co-located with the reception component 1102 in a transceiver.

The determination component 1108 may determine whether a resource is available for use by one or more other UEs, whether a UE has reserved a resource, whether a resource identified in a device-to-device coordination message is available for use by the apparatus 1100, and/or the like. In some aspects, the determination component 1108 may include one or more antennas, a demodulator, a MIMO detector, a receive processor, a modulator, a transmit MIMO processor, a transmit processor, a controller/processor, or a memory, of the UE described above in connection with FIG. 2. The transmission component 1104 may transmit a device-to-device coordination message to indicate whether the resource is available for use by the one or more other UEs.

The prioritization component 1110 may prioritize a resource for use in transmission based at least in part on a content of the device-to-device coordination message. In some aspects, the prioritization component 1110 may include a modulator, a transmit MIMO processor, a transmit processor, a controller/processor, or a memory, of the UE described above in connection with FIG. 2.

The sensing component 1112 may perform pre-transmission sensing of whether a resource is available based at least in part on a content of a device-to-device coordination message. In some aspects, the prioritization component 1110 may include one or more antennas, a demodulator, a MIMO detector, a receive processor, a controller/processor, or a memory, of the UE described above in connection with FIG. 2.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

Figure 12:
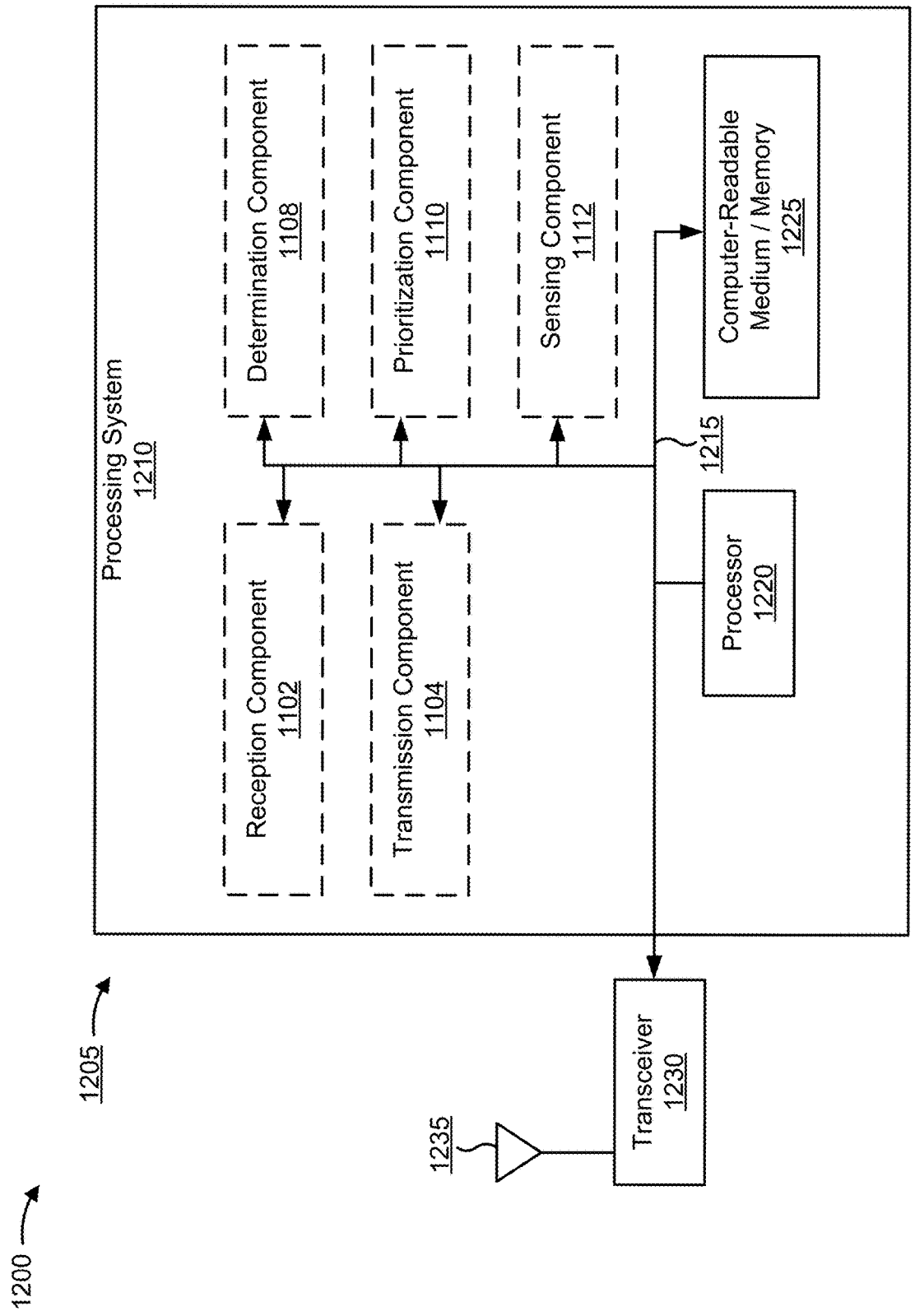
FIG. 12 is a diagram illustrating an example of a hardware implementation for an apparatus employing a processing system, in accordance with the present disclosure.

FIG. 12 is a diagram illustrating an example 1200 of a hardware implementation for an apparatus 1205 employing a processing system 1210. The apparatus 1205 may be a UE.

The processing system 1210 may be implemented with a bus architecture, represented generally by the bus 1215. The bus 1215 may include any number of interconnecting buses and bridges depending on the specific application of the processing system 1210 and the overall design constraints. The bus 1215 links together various circuits including one or more processors and/or hardware components, represented by the processor 1220, the illustrated components, and the computer-readable medium/memory 1225. The bus 1215 may also link various other circuits, such as timing sources, peripherals, voltage regulators, or power management circuits, and/or the like.

The processing system 1210 may be coupled to a transceiver 1230. The transceiver 1230 is coupled to one or more antennas 1235. The transceiver 1230 provides a means for communicating with various other apparatuses over a transmission medium. The transceiver 1230 receives a signal from the one or more antennas 1235, extracts information from the received signal, and provides the extracted information to the processing system 1210, specifically the reception component 1102. In addition, the transceiver 1230 receives information from the processing system 1210, specifically the transmission component 1104, and generates a signal to be applied to the one or more antennas 1235 based at least in part on the received information.

The processing system 1210 includes a processor 1220 coupled to a computer-readable medium/memory 1225. The processor 1220 is responsible for general processing, including the execution of software stored on the computer-readable medium/memory 1225. The software, when executed by the processor 1220, causes the processing system 1210 to perform the various functions described herein for any particular apparatus. The computer-readable medium/memory 1225 may also be used for storing data that is manipulated by the processor 1220 when executing software. The processing system further includes at least one of the illustrated components. The components may be software modules running in the processor 1220, resident/stored in the computer readable medium/memory 1225, or one or more hardware modules coupled to the processor 1220.

In some aspects, the processing system 1210 may be a component of the UE 120 and may include the memory 282 and/or at least one of the TX MIMO processor 266, the RX processor 258, and/or the controller/processor 280. In some aspects, the apparatus 1205 for wireless communication includes means for determining whether a resource is available for use by one or more other UEs, means for transmitting a device-to-device coordination message to indicate whether the resource is available for use by the one or more other UEs, means for receiving a device-to-device coordination message indicating whether a resource is available for use by one or more UEs, means for determining whether the resource is available for use by the UE based at least in part on the device-to-device coordination message, and/or the like. The aforementioned means may be one or more of the aforementioned components of the apparatus 1100 and/or the processing system 1210 of the apparatus 1205 configured to perform the functions recited by the aforementioned means. As described elsewhere herein, the processing system 1210 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 12 is provided as an example. Other examples may differ from what is described in connection with FIG. 12.

Figure 13:
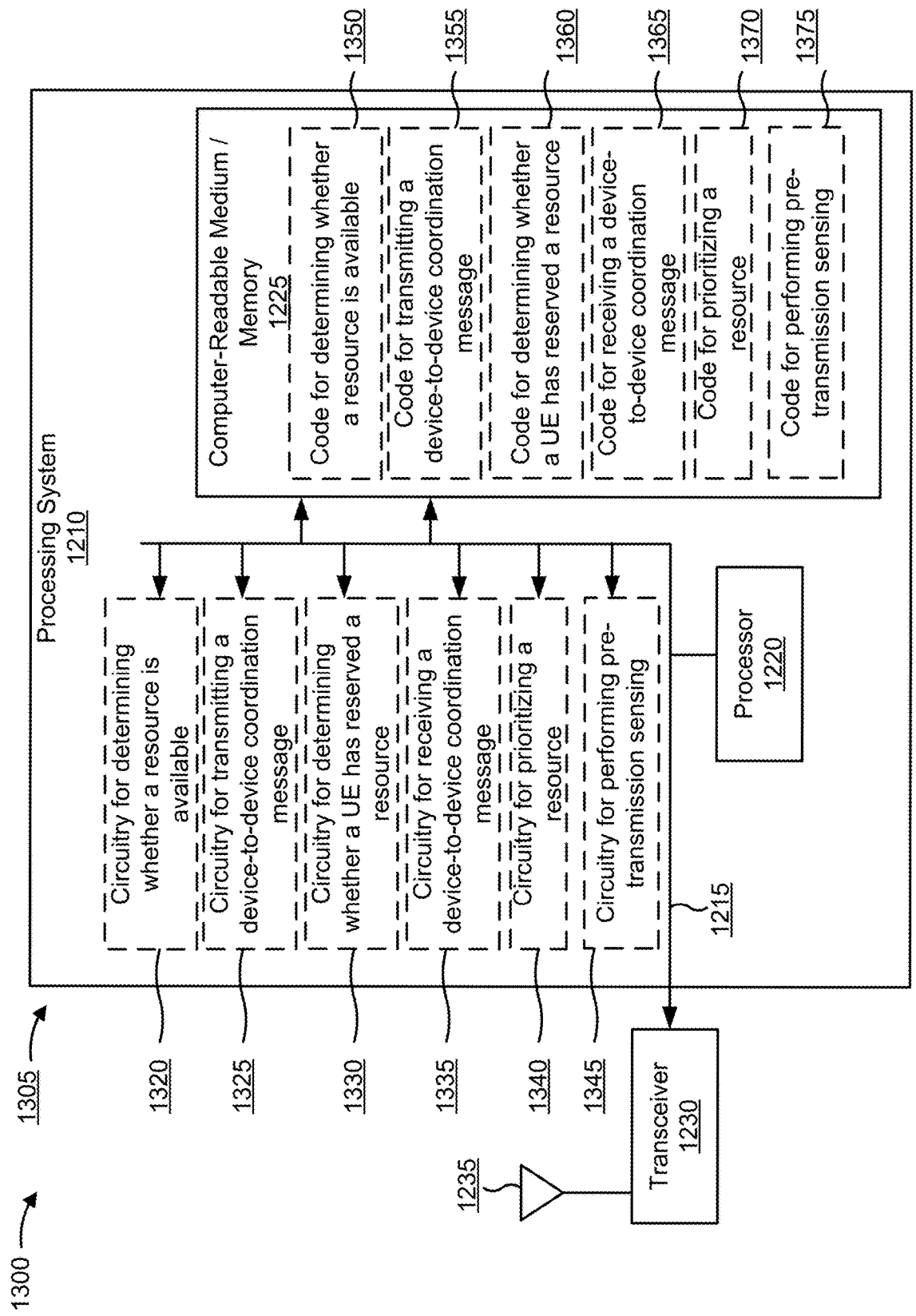
FIG. 13 is a diagram illustrating an example implementation of code and circuitry for an apparatus, in accordance with the present disclosure.

FIG. 13 is a diagram illustrating an example 1300 of an implementation of code and circuitry for an apparatus 1305. The apparatus 1305 may be a UE.

As further shown in FIG. 13, the apparatus may include circuitry for determining whether a resource is available (circuitry 1320). For example, the apparatus may include circuitry to enable the apparatus to determine whether a resource is available for use by one or more other apparatuses, to determine whether the resource is available for use by the apparatus, and/or the like.

As further shown in FIG. 13, the apparatus may include circuitry for transmitting a device-to-device coordination message (circuitry 1325). For example, the apparatus may include circuitry to enable the apparatus to transmit a device-to-device coordination message to indicate whether the resource is available for use by the one or more other UEs.

As further shown in FIG. 13, the apparatus may include circuitry for determining whether a UE has reserved a resource (circuitry 1330). For example, the apparatus may include circuitry to enable the apparatus to determine whether a UE has reserved a resource.

As further shown in FIG. 13, the apparatus may include circuitry for receiving a device-to-device coordination message (circuitry 1335). For example, the apparatus may include circuitry to enable the apparatus to receive a device-to-device coordination message indicating whether a resource is available for use by one or more apparatuses.

As further shown in FIG. 13, the apparatus may include circuitry for prioritizing a resource (circuitry 1340). For example, the apparatus may include circuitry to enable the apparatus to prioritize the resource for use in transmission based at least in part on a content of the device-to-device coordination message.

As further shown in FIG. 13, the apparatus may include circuitry for performing pre-transmission sensing (circuitry 1345). For example, the apparatus may include circuitry to enable the apparatus to performing pre-transmission sensing of whether the resource is available based at least in part on a content of the device-to-device coordination message.

As further shown in FIG. 13, the apparatus may include, stored in computer-readable medium 1225, code for determining whether a resource is available (code 1350). For example, the apparatus may include code that, when executed by the processor 1220, may cause the processor 1220 to determine whether a resource is available.

As further shown in FIG. 13, the apparatus may include, stored in computer-readable medium 1225, code for transmitting a device-to-device coordination message (code 1355). For example, the apparatus may include code that, when executed by the processor 1220, may cause the transceiver 1230 to transmit a device-to-device coordination message.

As further shown in FIG. 13, the apparatus may include, stored in computer-readable medium 1225, code for determining whether a UE has reserved a resource (code 1360). For example, the apparatus may include code that, when executed by the processor 1220, may cause the processor 1220 to determine whether a UE has reserved a resource.

As further shown in FIG. 13, the apparatus may include, stored in computer-readable medium 1225, code for receiving a device-to-device coordination message (code 1365). For example, the apparatus may include code that, when executed by the processor 1220, may cause the processor 1220 to cause the transceiver 1230 to receive a device-to-device coordination message.

As further shown in FIG. 13, the apparatus may include, stored in computer-readable medium 1225, code for prioritizing a resource (code 1370). For example, the apparatus may include code that, when executed by the processor 1220, may cause the processor 1220 to prioritize a resource.

As further shown in FIG. 13, the apparatus may include, stored in computer-readable medium 1225, code for performing pre-transmission sensing (code 1375). For example, the apparatus may include code that, when executed by the processor 1220, may cause the processor 1220 to cause transceiver 1230 to perform pre-transmission sensing.

FIG. 13 is provided as an example. Other examples may differ from what is described in connection with FIG. 13.

Figure 14:
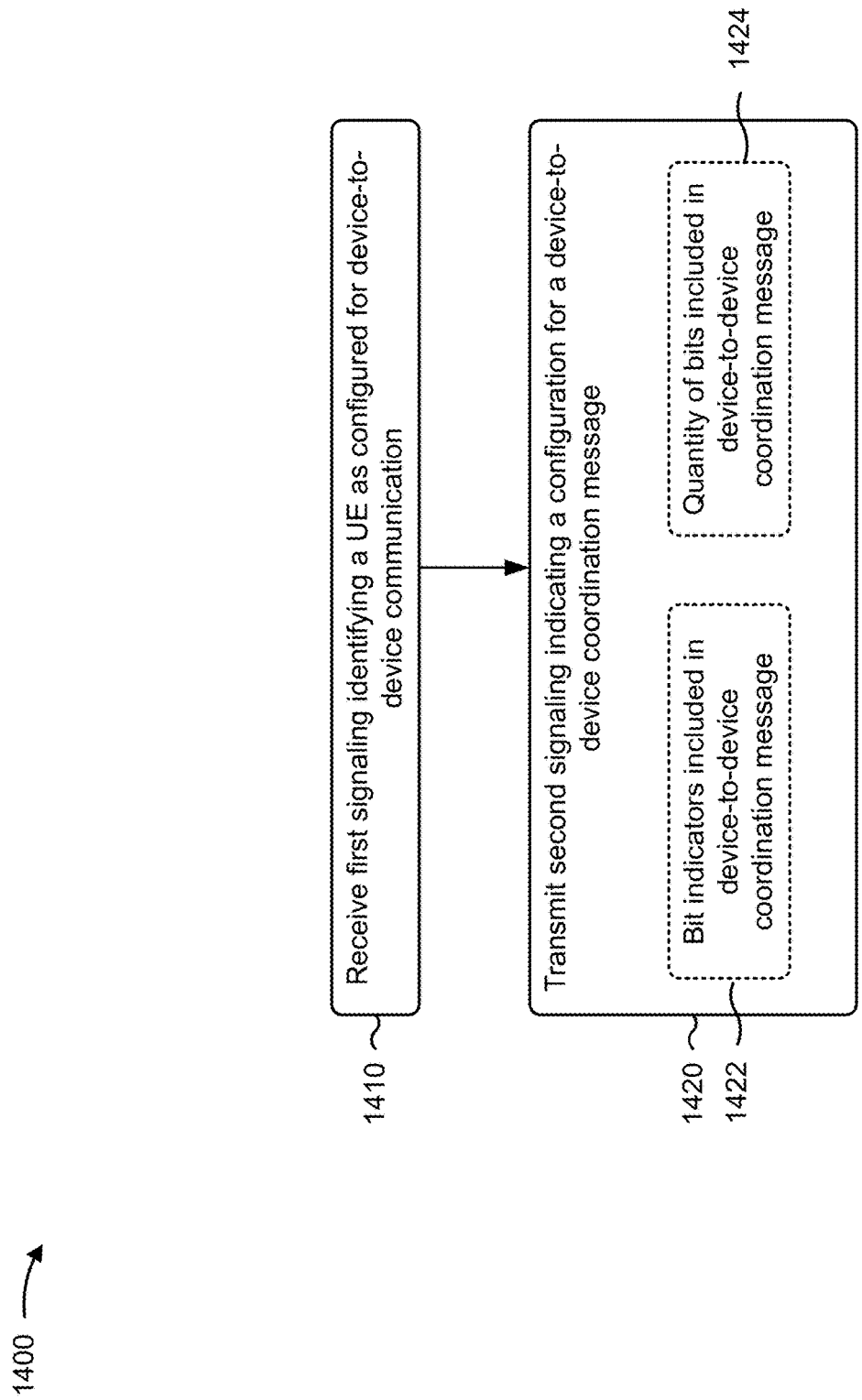
FIG. 14 is a diagram illustrating an example process associated with resource indication for device-to-device coordination, in accordance with the present disclosure.

FIG. 14 is a diagram illustrating an example process 1400 performed, for example, by a base station, in accordance with the present disclosure. Example process 1400 is an example where the base station (e.g., base station 110) performs operations associated with resource indication for device-to-device coordination.

As shown in FIG. 14, in some aspects, process 1400 may include receiving first signaling identifying a UE as configured for device-to-device communication (block 1410). For example, the base station (e.g., using communication manager 160 and/or reception component 1502, depicted in FIG. 15) may receive first signaling identifying a UE as configured for device-to-device communication, as described above.

As further shown in FIG. 14, in some aspects, process 1400 may include transmitting second signaling indicating a configuration for a device-to-device coordination message (block 1420). For example, the base station (e.g., using communication manager 160 and/or transmission component 1504, depicted in FIG. 15) may transmit second signaling indicating a configuration for a device-to-device coordination message associated with an identification of available resources for device-to-device communication, as described above.

As further shown in FIG. 14, in some aspects, the second signaling may identify bit indicators included in a device-to-device coordination message (block 1422). For example, the base station (e.g., using communication manager 160 and/or transmission component 1504, depicted in FIG. 15) may transmit second signaling identifying bit indicators included in a device-to-device coordination message, as described above.

As further shown in FIG. 14, in some aspects, the second signaling may identify a quantity of bits included in a device-to-device coordination message (block 1424). For example, the base station (e.g., using communication manager 160 and/or transmission component 1504, depicted in FIG. 15) may transmit second signaling identifying a quantity of bits included in a device-to-device coordination message, as described above.

Process 1400 may include additional aspects, such as any single aspect or any combination of aspects described below and/or in connection with one or more other processes described elsewhere herein.

In a first aspect, the second signaling indicates a quantity of bits included in the device-to-device coordination message.

In a second aspect, alone or in combination with the first aspect, the second signaling indicates that the device-to-device coordination message includes a bit indicator indicating whether a resource is at least one of unavailable to a UE that requested transmission of the device-to-device coordination message, available to the UE that requested transmission of the device-to-device coordination message and subject to another resource reservation by another UE, available to any UE, or unavailable to any UE except the UE that requested transmission of the device-to-device coordination message.

In a third aspect, alone or in combination with one or more of the first and second aspects, the second signaling indicates that the device-to-device coordination message includes a bit indicator indicating whether the resource is reserved by at least one of a UE that requested transmission of the device-to-device coordination message, or a UE other than the UE that requested the transmission of the device-to-device coordination message.

In a fourth aspect, alone or in combination with one or more of the first through third aspects, the second signaling indicates that the device-to-device coordination message includes a bit indicator identifying a UE that reserved a resource.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
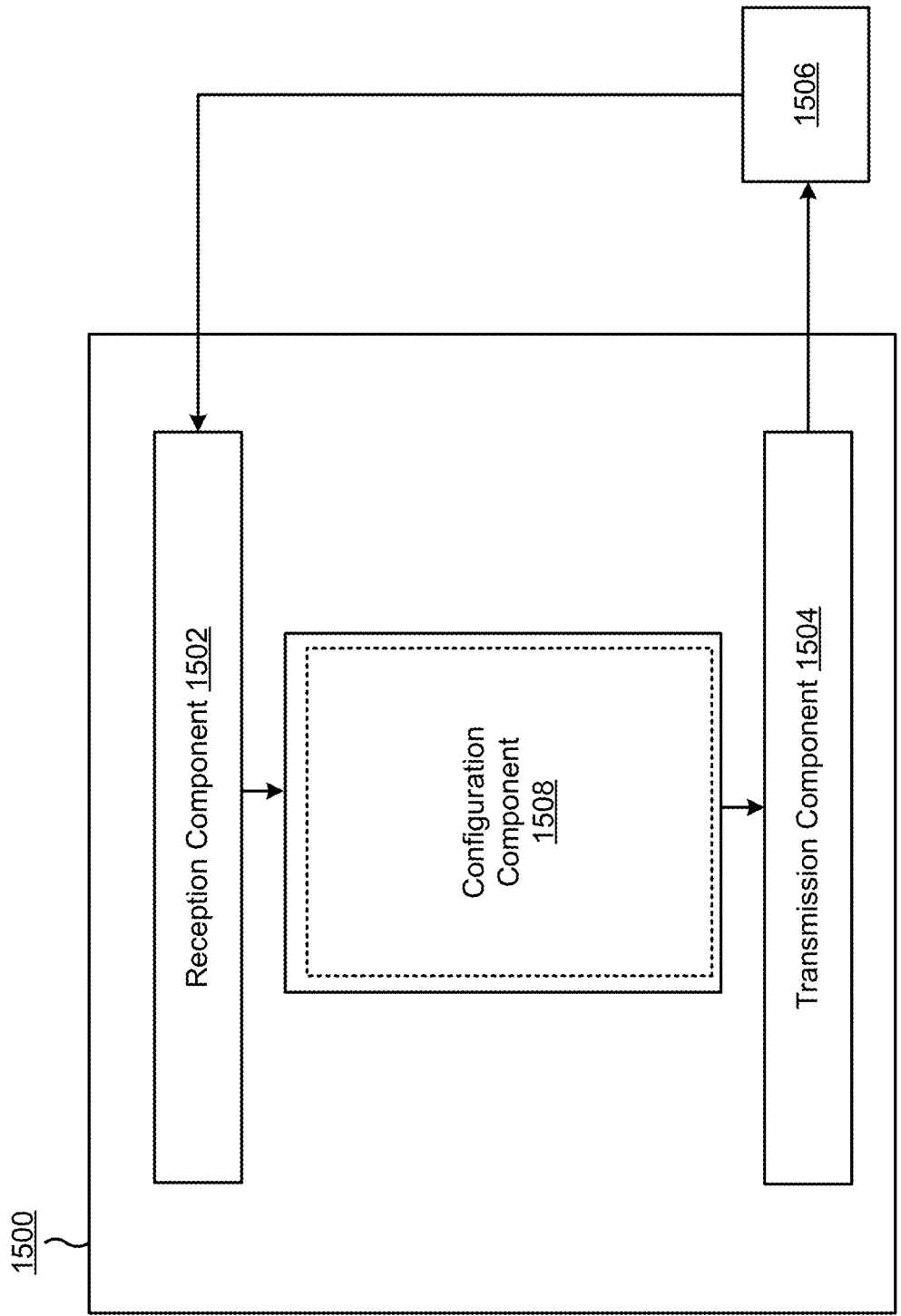
FIG. 15 is a diagram of an example apparatus for wireless communication, in accordance with the present disclosure.

FIG. 15 is a diagram of an example apparatus 1500 for wireless communication. The apparatus 1500 may be a base station, or a base station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 150. The communication manager 150 may include a configuration component 1508, among other examples.

In some aspects, the apparatus 1500 may be configured to perform one or more operations described herein in connection with FIGS. 8A-8B. Additionally, or alternatively, the apparatus 1500 may be configured to perform one or more processes described herein, such as process 1400 of FIG. 14. In some aspects, the apparatus 1500 and/or one or more components shown in FIG. 15 may include one or more components of the base station described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, or data communications, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a modem, a demodulator, a MIMO detector, a receive processor, a controller/processor, or a memory of the base station described in connection with FIG. 2.

The transmission component 1504 may transmit communications, such as reference signals, control information, or data communications, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, or a memory of the base station described in connection with FIG. 2. In some aspects, the transmission component 1504 may be co-located with the reception component 1502 in a transceiver.

The reception component 1502 may receive first signaling identifying a UE as configured for device-to-device communication. The transmission component 1504 may transmit second signaling indicating a configuration for a device-to-device coordination message associated with an identification of available resources for device-to-device communication. The configuration component 1508 may set a configuration of a device-to-device coordination message.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
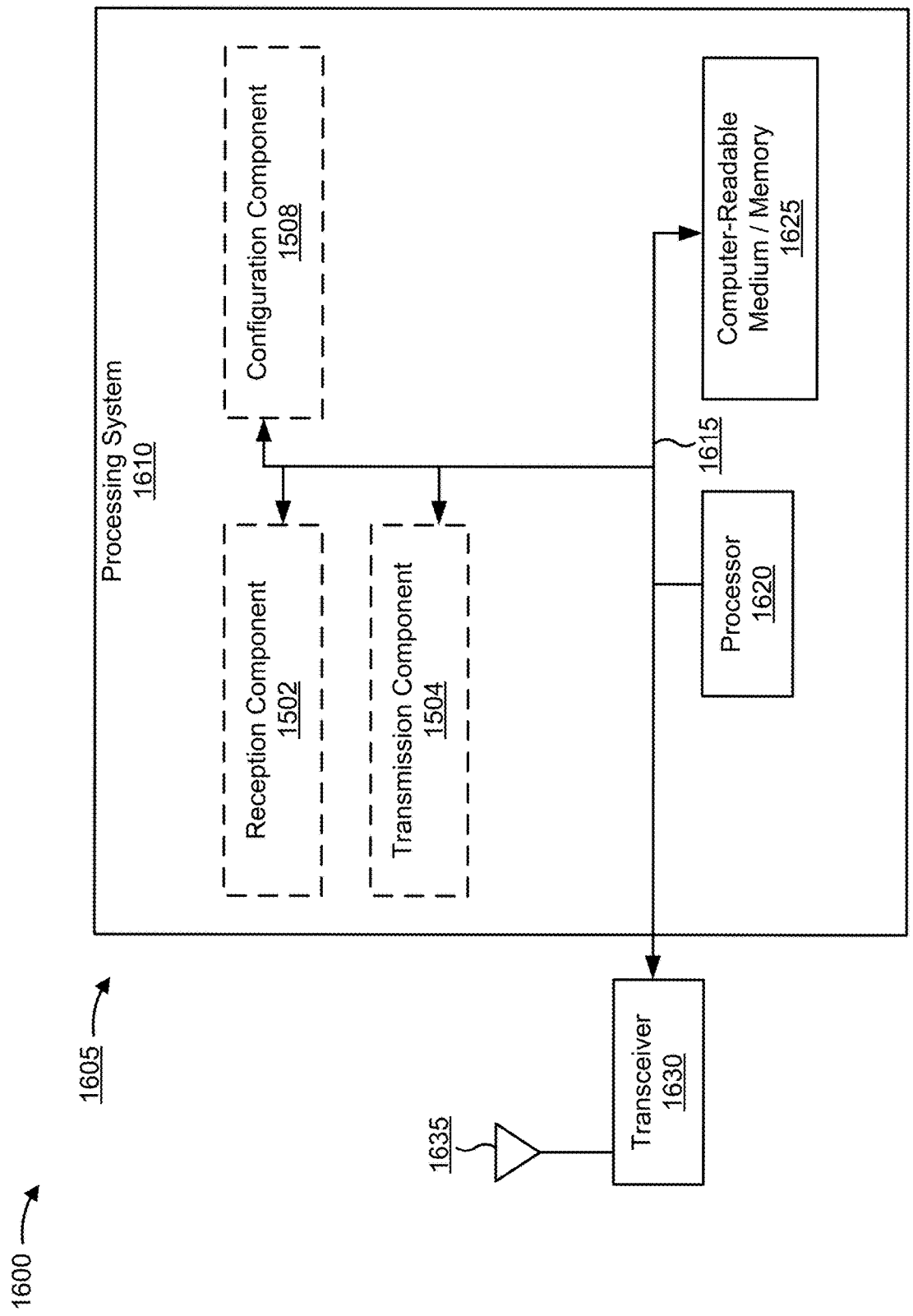
FIG. 16 is a diagram illustrating an example of a hardware implementation for an apparatus employing a processing system, in accordance with the present disclosure.

FIG. 16 is a diagram illustrating an example 1600 of a hardware implementation for an apparatus 1605 employing a processing system 1610. The apparatus 1605 may be a base station.

The processing system 1610 may be implemented with a bus architecture, represented generally by the bus 1615. The bus 1615 may include any number of interconnecting buses and bridges depending on the specific application of the processing system 1610 and the overall design constraints. The bus 1615 links together various circuits including one or more processors and/or hardware components, represented by the processor 1620, the illustrated components, and the computer-readable medium/memory 1625. The bus 1615 may also link various other circuits, such as timing sources, peripherals, voltage regulators, and/or power management circuits.

The processing system 1610 may be coupled to a transceiver 1630. The transceiver 1630 is coupled to one or more antennas 1635. The transceiver 1630 provides a means for communicating with various other apparatuses over a transmission medium. The transceiver 1630 receives a signal from the one or more antennas 1635, extracts information from the received signal, and provides the extracted information to the processing system 1610, specifically the reception component 1502. In addition, the transceiver 1630 receives information from the processing system 1610, specifically the transmission component 1504, and generates a signal to be applied to the one or more antennas 1635 based at least in part on the received information.

The processing system 1610 includes a processor 1620 coupled to a computer-readable medium/memory 1625. The processor 1620 is responsible for general processing, including the execution of software stored on the computer-readable medium/memory 1625. The software, when executed by the processor 1620, causes the processing system 1610 to perform the various functions described herein for any particular apparatus. The computer-readable medium/memory 1625 may also be used for storing data that is manipulated by the processor 1620 when executing software. The processing system further includes at least one of the illustrated components. The components may be software modules running in the processor 1620, resident/stored in the computer readable medium/memory 1625, or one or more hardware modules coupled to the processor 1620.

In some aspects, the processing system 1610 may be a component of the base station 110 and may include the memory 242 and/or at least one of the TX MIMO processor 230, the RX processor 238, and/or the controller/processor 240. In some aspects, the apparatus 1605 for wireless communication includes means for receiving first signaling identifying a UE as configured for device-to-device communication, and means for transmitting second signaling indicating a configuration for a device-to-device coordination message associated with an identification of available resources for device-to-device communication. The aforementioned means may be one or more of the aforementioned components of the apparatus 1500 and/or the processing system 1610 of the apparatus 1605 configured to perform the functions recited by the aforementioned means. As described elsewhere herein, the processing system 1610 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 16 is provided as an example. Other examples may differ from what is described in connection with FIG. 16.

Figure 17:
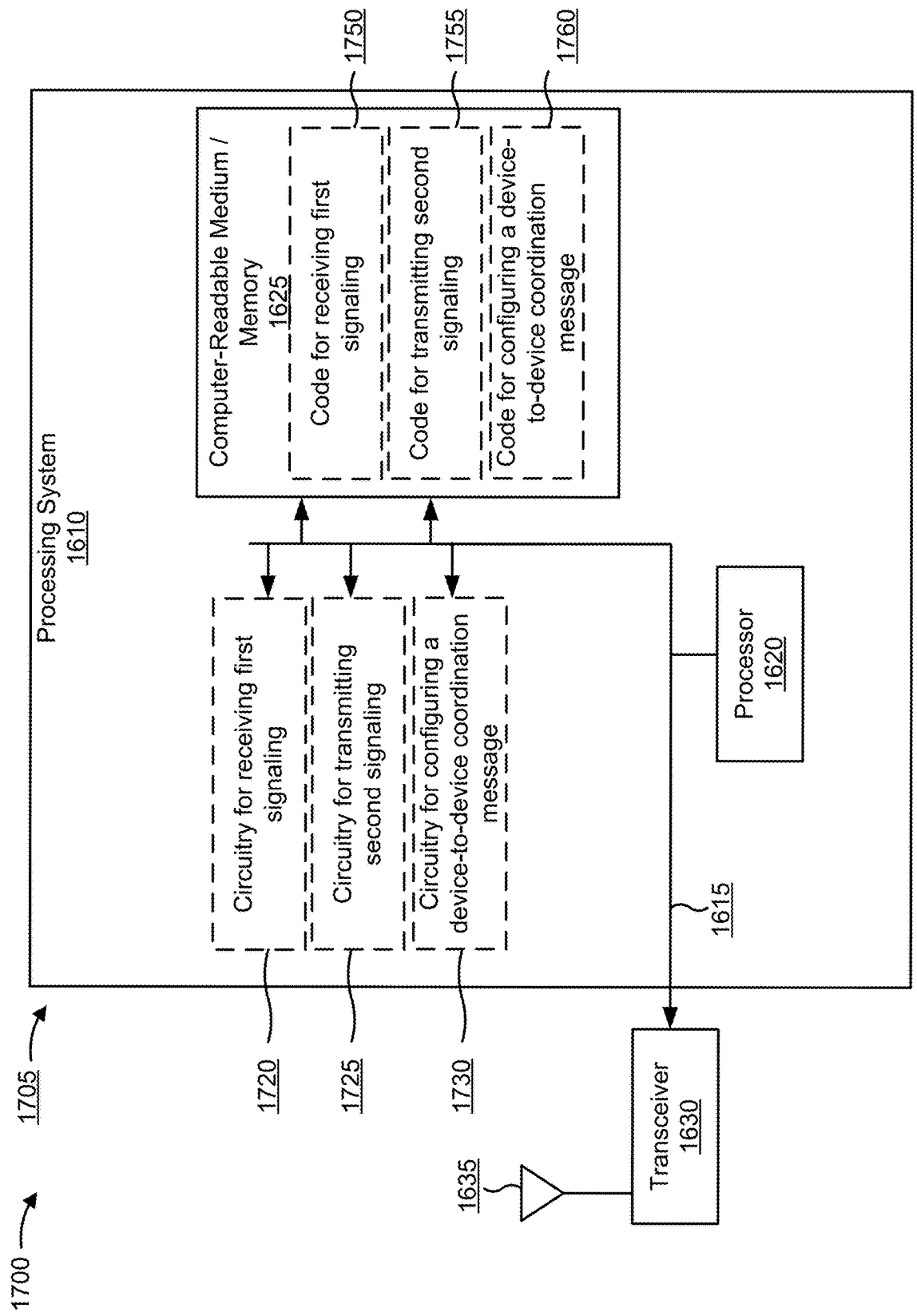
FIG. 17 is a diagram illustrating an example implementation of code and circuitry for an apparatus, in accordance with the present disclosure.

FIG. 17 is a diagram illustrating an example 1700 of an implementation of code and circuitry for an apparatus 1705. The apparatus 1705 may be a UE.

As further shown in FIG. 17, the apparatus may include circuitry for receiving first signaling (circuitry 1720). For example, the apparatus may include circuitry to enable the apparatus receive first signaling identifying a UE as configured for device-to-device communication.

As further shown in FIG. 17, the apparatus may include circuitry for transmitting second signaling (circuitry 1725). For example, the apparatus may include circuitry to enable the apparatus to transmit second signaling indicating a configuration for a device-to-device coordination message associated with an identification of available resources for device-to-device communication.

As further shown in FIG. 17, the apparatus may include circuitry for configuring a device-to-device coordination message (circuitry 1730). For example, the apparatus may include circuitry to enable the apparatus to set a configuration for a device-to-device coordination message that a UE is to transmit.

As further shown in FIG. 17, the apparatus may include, stored in computer-readable medium 1625, code for receiving first signaling (code 1750). For example, the apparatus may include code that, when executed by the processor 1620, may cause the transceiver 1630 to receive first signaling identifying a UE as configured for device-to-device communication.

As further shown in FIG. 17, the apparatus may include, stored in computer-readable medium 1625, code for transmitting second signaling (code 1755). For example, the apparatus may include code that, when executed by the processor 1620, may cause the transceiver 1630 to transmit second signaling indicating a configuration for a device-to-device coordination message associated with an identification of available resources for device-to-device communication.

As further shown in FIG. 17, the apparatus may include, stored in computer-readable medium 1625, code for configuring a device-to-device coordination message (code 1760). For example, the apparatus may include code that, when executed by the processor 1620, may cause the processor 1620 to set a configuration for a device-to-device coordination message that a UE is to transmit.

FIG. 17 is provided as an example. Other examples may differ from what is described in connection with FIG. 17.

The following provides an overview of some Aspects of the present disclosure:

Aspect 1: A method of wireless communication performed by a user equipment (UE), comprising: determining whether a resource is available for use by one or more other UEs; and transmitting a device-to-device coordination message to indicate whether the resource is available for use by the one or more other UEs.

Aspect 2: The method of Aspect 1, wherein transmitting the device-to-device coordination message comprises: transmitting a first device-to-device coordination message to a first UE of the one or more other UEs; and transmitting a second device-to-device coordination message to a second UE of the one or more other UEs.

Aspect 3: The method of Aspect 2, wherein determining whether the resource is available comprises: determining that the first UE has reserved the resource, and wherein the first device-to-device coordination message indicates that the resource is available to the first UE, and the second device-to-device coordination message indicates that the resource is unavailable to the second UE.

Aspect 4: The method of any of Aspects 1 to 3, wherein transmitting the device-to-device coordination message comprises: transmitting a single device-to-device coordination message to a first UE of the one or more other UEs and to a second UE of the one or more other UEs.

Aspect 5: The method of Aspect 4, further comprising: determining that the first UE has reserved the resource, and wherein the single device-to-device coordination message indicates that the resource is unavailable.

Aspect 6: The method of any of Aspects 4 to 5, wherein the single device-to-device coordination message includes a set of identifiers of a set of UEs that reserved the resource.

Aspect 7: The method of any of Aspects 4 to 6, wherein the single device-to-device coordination message includes a bit indicator indicating whether the resource is reserved by at least one of: a UE that requested transmission of the single device-to-device coordination message, or a UE other than the UE that requested the transmission of the single device-to-device coordination message.

Aspect 8: The method of any of Aspects 4 to 7, wherein the single device-to-device coordination message includes a bit indicator indicating whether the resource is at least one of: unavailable to a UE that requested transmission of the single device-to-device coordination message, available to the UE that requested transmission of the single device-to-device coordination message and subject to resource reservation by another UE, available to any UE, or unavailable to any UE except the UE that requested transmission of the single device-to-device coordination message.

Aspect 9: A method of wireless communication performed by a user equipment (UE), comprising: receiving a device-to-device coordination message indicating whether a resource is available for use by one or more UEs; and determining whether the resource is available for use by the UE based at least in part on the device-to-device coordination message.

Aspect 10: The method of Aspect 9, wherein the device-to-device coordination message is a UE-specific device-to-device coordination message; and wherein determining whether the resource is available comprises: determining whether the resource is available based at least in part on a content of the device-to-device coordination message.

Aspect 11: The method of any of Aspects 9 to 10, wherein receiving the device-to-device coordination message comprises: receiving a UE-common device-to-device coordination message transmitted to a plurality of UEs; and wherein determining whether the resource is available comprises: determining whether the resource is available based at least in part on a content of the UE-common device-to-device coordination message and whether the UE attempted to reserve the resource.

Aspect 12: The method of any of Aspects 9 to 11, wherein the device-to-device coordination message includes an identifier of a set of UEs that reserved the resource.

Aspect 13: The method of any of Aspects 9 to 12, wherein the device-to-device coordination message includes a bit indicator indicating whether the resource is reserved by at least one of: a UE that requested transmission of the device-to-device coordination message, or a UE other than the UE that requested the transmission of the device-to-device coordination message.

Aspect 14: The method of any of Aspects 9 to 13, wherein the device-to-device coordination message includes a bit indicator indicating whether the resource is at least one of: unavailable to a UE that requested transmission of the device-to-device coordination message, available to the UE that requested transmission of the device-to-device coordination message and subject to another resource reservation by another UE, available to any UE, or unavailable to any UE except the UE that requested transmission of the device-to-device coordination message.

Aspect 15: The method of any of Aspects 9 to 14, further comprising: prioritizing the resource for use in transmission based at least in part on a content of the device-to-device coordination message.

Aspect 16: The method of any of Aspects 9 to 15, wherein determining whether the resource is available comprises: performing pre-transmission sensing of whether the resource is available based at least in part on a content of the device-to-device coordination message.

Aspect 17: The method of Aspect 16, wherein determining whether the resource is available comprises: determining whether the resource is available based at least in part on a result of performing pre-transmission sensing and a stored configuration for evaluating the result.

Aspect 18: A method of wireless communication performed by a user equipment (UE), comprising: receiving a request for a device-to-device coordination message to indicate whether a resource is available for use by one or more UEs; transmitting the device-to-device coordination message to indicate whether the resource is available for use by the one or more UEs, wherein the device-to-device coordination message includes a bit indicator indicating whether the resource is at least one of: unavailable to a UE that requested transmission of the single device-to-device coordination message, available to the UE that requested transmission of the single device-to-device coordination message and subject to resource reservation by another UE, available to any UE, or unavailable to any UE except the UE that requested transmission of the single device-to-device coordination message.

Aspect 19: The method of Aspect 18, further comprising: determining whether a resource is available for use by one or more other UEs; and wherein transmitting the device-to-device coordination message comprises: transmitting the device-to-device coordination message based at least in part on determining whether the resource is available. wherein transmitting the device-to-device coordination message comprises: transmitting the device-to-device coordination message based at least in part on determining whether the resource is available.

Aspect 20: The method of any of Aspects 18 to 19, comprising: transmitting a first device-to-device coordination message to a first UE of the one or more other UEs; and transmitting a second device-to-device coordination message to a second UE of the one or more other UEs.

Aspect 21: The method of Aspect 20, further comprising: determining that the first UE has reserved the resource, and wherein the first device-to-device coordination message indicates that the resource is available to the first UE, and the second device-to-device coordination message indicates that the resource is unavailable to the second UE.

Aspect 22: The method of any of Aspects 18 to 22, comprising: transmitting a single device-to-device coordination message to a first UE of the one or more other UEs and to a second UE of the one or more other UEs.

Aspect 23: The method of Aspect 22, further comprising: determining that the first UE has reserved the resource, and wherein the single device-to-device coordination message indicates that the resource is unavailable.

Aspect 24: The method of Aspect 22, wherein the single device-to-device coordination message includes a set of identifiers of a set of UEs that reserved the resource.

Aspect 25: The method of Aspect 22, wherein the single device-to-device coordination message includes a bit indicator indicating whether the resource is reserved by at least one of: a UE that requested transmission of the single device-to-device coordination message, or a UE other than the UE that requested the transmission of the single device-to-device coordination message.

Aspect 26: A method of wireless communication performed by a user equipment (UE), comprising: receiving a UE-common device-to-device coordination message transmitted to a plurality of UEs; and communicating on an available resource identified by a content of the UE-common device-to-device coordination message and identified by whether the UE attempted to reserve the resource.

Aspect 27: The method of Aspect 26, wherein the UE-common device-to-device coordination message includes an identifier of a set of UEs that reserved the resource.

Aspect 28: The method of any of Aspects 26 to 27, wherein the UE-common device-to-device coordination message includes a bit indicator indicating whether the resource is reserved by at least one of: a UE that requested transmission of the UE-common device-to-device coordination message, or a UE other than the UE that requested the transmission of the UE-common device-to-device coordination message.

Aspect 29: The method of any of Aspects 26 to 28, further comprising: performing pre-transmission sensing of whether the resource is available based at least in part on a content of the UE-common device-to-device coordination message.

Aspect 30: The method of Aspect 29, further comprising: determining whether the resource is available based at least in part on a result of performing pre-transmission sensing and a stored configuration for evaluating the result.

Aspect 31: A method of wireless communication performed by a user equipment (UE), comprising: receiving a device-to-device coordination message indicating whether a resource is available for use by one or more UEs, wherein the device-to-device coordination message includes a bit indicator indicating whether the resource is at least one of: unavailable to a UE that requested transmission of the device-to-device coordination message, available to the UE that requested transmission of the device-to-device coordination message and subject to another resource reservation by another UE, available to any UE, or unavailable to any UE except the UE that requested transmission of the device-to-device coordination message; and communicating on an available resource identified by the device-to-device coordination message.

Aspect 32: The method of Aspect 31, wherein the device-to-device coordination message is a UE-specific device-to-device coordination message; and further comprising: determining whether the resource is available based at least in part on a content of the device-to-device coordination message.

Aspect 33: The method of any of Aspects 31 to 32, wherein the device-to-device coordination message includes an identifier of a set of UEs that reserved the resource.

Aspect 34: The method of any of Aspects 31 to 33, wherein the device-to-device coordination message includes a bit indicator indicating whether the resource is reserved by at least one of: a UE that requested transmission of the device-to-device coordination message, or a UE other than the UE that requested the transmission of the device-to-device coordination message.

Aspect 35: The method of any of Aspects 31 to 34, further comprising: performing pre-transmission sensing of whether the resource is available based at least in part on a content of the device-to-device coordination message.

Aspect 36: The method of Aspect 35, further comprising: determining whether the resource is available based at least in part on a result of performing pre-transmission sensing and a stored configuration for evaluating the result.

Aspect 37: A method of wireless communication performed by a user equipment (UE), comprising: receiving a device-to-device coordination message indicating whether a resource is available for use by one or more UEs; communicating on an available resource identified in the device-to-device coordination message, wherein the available resource is associated with a prioritization relative to one or more other available resources identified in the device-to-device coordination message.

Aspect 38: The method of Aspect 37, wherein the device-to-device coordination message is a UE-specific device-to-device coordination message; and further comprising: determining whether the resource is available based at least in part on a content of the device-to-device coordination message.

Aspect 39: The method of any of Aspects 37 to 38, wherein the device-to-device coordination message includes an identifier of a set of UEs that reserved the resource.

Aspect 40: The method of any of Aspects 37 to 39, wherein the device-to-device coordination message includes a bit indicator indicating whether the resource is reserved by at least one of: a UE that requested transmission of the device-to-device coordination message, or a UE other than the UE that requested the transmission of the device-to-device coordination message.

Aspect 41: The method of any of Aspects 37 to 40, comprising: performing pre-transmission sensing of whether the resource is available based at least in part on a content of the device-to-device coordination message.

Aspect 42: The method of Aspect 41, further comprising: determining whether the resource is available based at least in part on a result of performing pre-transmission sensing and a stored configuration for evaluating the result.

Aspect 43: A method of wireless communication performed by a base station, comprising: receiving first signaling identifying a user equipment (UE) as configured for device-to-device communication; and transmitting second signaling indicating a configuration for a device-to-device coordination message associated with an identification of available resources for device-to-device communication.

Aspect 44: The method of Aspect 43, wherein the second signaling indicates a quantity of bits are included in the device-to-device coordination message.

Aspect 45: The method of any of Aspects 43 to 44, wherein the second signaling indicates that the device-to-device coordination message includes a bit indicator indicating whether a resource is at least one of: unavailable to a UE that requested transmission of the device-to-device coordination message, available to the UE that requested transmission of the device-to-device coordination message and subject to another resource reservation by another UE, available to any UE, or unavailable to any UE except the UE that requested transmission of the device-to-device coordination message.

Aspect 46: The method of any of Aspects 43 to 45, wherein the second signaling indicates that the device-to-device coordination message includes a bit indicator indicating whether the resource is reserved by at least one of: a UE that requested transmission of the device-to-device coordination message, or a UE other than the UE that requested the transmission of the device-to-device coordination message.

Aspect 47: The method of any of Aspects 43 to 46, wherein the second signaling indicates that the device-to-device coordination message includes a bit indicator identifying a UE that reserved a resource.

Aspect 48: An apparatus for wireless communication at a device, comprising a processor; memory coupled with the processor; and instructions stored in the memory and executable by the processor to cause the apparatus to perform the method of one or more of Aspects 1-8.

Aspect 49: A device for wireless communication, comprising a memory and one or more processors coupled to the memory, the one or more processors configured to perform the method of one or more of Aspects 1-8.

Aspect 50: An apparatus for wireless communication, comprising at least one means for performing the method of one or more of Aspects 1-8.

Aspect 51: A non-transitory computer-readable medium storing code for wireless communication, the code comprising instructions executable by a processor to perform the method of one or more of Aspects 1-8.

Aspect 52: A non-transitory computer-readable medium storing a set of instructions for wireless communication, the set of instructions comprising one or more instructions that, when executed by one or more processors of a device, cause the device to perform the method of one or more of Aspects 1-8.

Aspect 53: An apparatus for wireless communication at a device, comprising a processor; memory coupled with the processor; and instructions stored in the memory and executable by the processor to cause the apparatus to perform the method of one or more of Aspects 9-17.

Aspect 54: A device for wireless communication, comprising a memory and one or more processors coupled to the memory, the one or more processors configured to perform the method of one or more of Aspects 9-17.

Aspect 55: An apparatus for wireless communication, comprising at least one means for performing the method of one or more of Aspects 9-17.

Aspect 56: A non-transitory computer-readable medium storing code for wireless communication, the code comprising instructions executable by a processor to perform the method of one or more of Aspects 9-17.

Aspect 57: A non-transitory computer-readable medium storing a set of instructions for wireless communication, the set of instructions comprising one or more instructions that, when executed by one or more processors of a device, cause the device to perform the method of one or more of Aspects 9-17.

Aspect 58: An apparatus for wireless communication at a device, comprising a processor; memory coupled with the processor; and instructions stored in the memory and executable by the processor to cause the apparatus to perform the method of one or more of Aspects 18-25.

Aspect 59: A device for wireless communication, comprising a memory and one or more processors coupled to the memory, the one or more processors configured to perform the method of one or more of Aspects 18-25.

Aspect 60: An apparatus for wireless communication, comprising at least one means for performing the method of one or more of Aspects 18-25.

Aspect 61: A non-transitory computer-readable medium storing code for wireless communication, the code comprising instructions executable by a processor to perform the method of one or more of Aspects 18-25.

Aspect 62: A non-transitory computer-readable medium storing a set of instructions for wireless communication, the set of instructions comprising one or more instructions that, when executed by one or more processors of a device, cause the device to perform the method of one or more of Aspects 18-25.

Aspect 63: An apparatus for wireless communication at a device, comprising a processor; memory coupled with the processor; and instructions stored in the memory and executable by the processor to cause the apparatus to perform the method of one or more of Aspects 26-30.

Aspect 64: A device for wireless communication, comprising a memory and one or more processors coupled to the memory, the one or more processors configured to perform the method of one or more of Aspects 26-30.

Aspect 65: An apparatus for wireless communication, comprising at least one means for performing the method of one or more of Aspects 26-30.

Aspect 66: A non-transitory computer-readable medium storing code for wireless communication, the code comprising instructions executable by a processor to perform the method of one or more of Aspects 26-30.

Aspect 67: A non-transitory computer-readable medium storing a set of instructions for wireless communication, the set of instructions comprising one or more instructions that, when executed by one or more processors of a device, cause the device to perform the method of one or more of Aspects 26-30.

Aspect 68: An apparatus for wireless communication at a device, comprising a processor; memory coupled with the processor; and instructions stored in the memory and executable by the processor to cause the apparatus to perform the method of one or more of Aspects 31-36.

Aspect 69: A device for wireless communication, comprising a memory and one or more processors coupled to the memory, the one or more processors configured to perform the method of one or more of Aspects 31-36.

Aspect 70: An apparatus for wireless communication, comprising at least one means for performing the method of one or more of Aspects 31-36.

Aspect 71: A non-transitory computer-readable medium storing code for wireless communication, the code comprising instructions executable by a processor to perform the method of one or more of Aspects 31-36.

Aspect 72: A non-transitory computer-readable medium storing a set of instructions for wireless communication, the set of instructions comprising one or more instructions that, when executed by one or more processors of a device, cause the device to perform the method of one or more of Aspects 31-36.

Aspect 73: An apparatus for wireless communication at a device, comprising a processor; memory coupled with the processor; and instructions stored in the memory and executable by the processor to cause the apparatus to perform the method of one or more of Aspects 37-42.

Aspect 74: A device for wireless communication, comprising a memory and one or more processors coupled to the memory, the one or more processors configured to perform the method of one or more of Aspects 37-42.

Aspect 75: An apparatus for wireless communication, comprising at least one means for performing the method of one or more of Aspects 37-42.

Aspect 76: A non-transitory computer-readable medium storing code for wireless communication, the code comprising instructions executable by a processor to perform the method of one or more of Aspects 37-42.

Aspect 77: A non-transitory computer-readable medium storing a set of instructions for wireless communication, the set of instructions comprising one or more instructions that, when executed by one or more processors of a device, cause the device to perform the method of one or more of Aspects 37-42.

Aspect 78: An apparatus for wireless communication at a device, comprising a processor; memory coupled with the processor; and instructions stored in the memory and executable by the processor to cause the apparatus to perform the method of one or more of Aspects 43-47.

Aspect 79: A device for wireless communication, comprising a memory and one or more processors coupled to the memory, the one or more processors configured to perform the method of one or more of Aspects 43-47.

Aspect 80: An apparatus for wireless communication, comprising at least one means for performing the method of one or more of Aspects 43-47.

Aspect 81: A non-transitory computer-readable medium storing code for wireless communication, the code comprising instructions executable by a processor to perform the method of one or more of Aspects 43-47.

Aspect 82: A non-transitory computer-readable medium storing a set of instructions for wireless communication, the set of instructions comprising one or more instructions that, when executed by one or more processors of a device, cause the device to perform the method of one or more of Aspects 43-47.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
   receive information associated with a device-to-device coordination message to indicate whether a resource is available for use by one or more UEs; and
   transmit the device-to-device coordination message to indicate whether the resource is available for use by the one or more UEs, wherein the device-to-device coordination message includes a bit indicator set to a value, from a set of values for the bit indicator, that indicates an availability of the resource, wherein the set of values for the bit indicator comprises:
   a first value indicating that the resource is unavailable to a UE that requested transmission of the device-to-device coordination message,
   a second value indicating that the resource is available to the UE that requested the transmission of the device-to-device coordination message and is subject to resource reservation by another UE,
   a third value indicating that the resource is available to any UE, and
   a fourth value indicating that the resource is unavailable to any UE except the UE that requested the transmission of the device-to-device coordination message.

2. The UE of claim 1, wherein the information associated with the device-to-device coordination message includes a request for the device-to-device coordination message.

3. The UE of claim 1, wherein the information associated with the device-to-device coordination message includes a configuration of one or more parameters for the device-to-device coordination message.

4. The UE of claim 1, wherein the device-to-device coordination message includes the bit indicator set to the first value indicating that the resource is unavailable to a UE that requested the transmission of the device-to-device coordination message.

5. The UE of claim 1, wherein the device-to-device coordination message includes the bit indicator set to the first value indicating that the resource is available to the UE that requested the transmission of the device-to-device coordination message and subject to resource reservation by another UE.

6. The UE of claim 1, wherein the device-to-device coordination message includes the bit indicator set to the second value indicating that the resource is available to any UE.

7. The UE of claim 1, wherein the device-to-device coordination message includes the bit indicator set to the third value indicating that the resource is unavailable to any UE except the UE that requested the transmission of the device-to-device coordination message.

8. The UE of claim 1, wherein the one or more processors are further configured to:
 determine whether the resource is available for use by one or more other UEs; and
 wherein the one or more processors, when transmitting the device-to-device coordination message, are configured to:
  transmit the device-to-device coordination message based at least in part on determining whether the resource is available.

9. The UE of claim 1, wherein the one or more processors, to transmit the device-to-device coordination message, are configured to:
 transmit a first device-to-device coordination message to a first UE of the one or more UEs; and
 transmit a second device-to-device coordination message to a second UE of the one or more UEs.

10. The UE of claim 9, wherein the one or more processors are further configured to:
 determine that the first UE has reserved the resource, and wherein the first device-to-device coordination message indicates that the resource is available to the first UE, and the second device-to-device coordination message indicates that the resource is unavailable to the second UE.

11. The UE of claim 1, wherein the one or more processors, to transmit the device-to-device coordination message, are configured to:
 transmit a single device-to-device coordination message to a first UE of the one or more UEs and to a second UE of the one or more UEs.

12. The UE of claim 11, wherein the one or more processors are further configured to:
 determine that the first UE has reserved the resource, and wherein the single device-to-device coordination message indicates that the resource is unavailable.

13. The UE of claim 11, wherein the single device-to-device coordination message includes a set of identifiers of a set of UEs that reserved the resource.

14. The UE of claim 11, wherein the single device-to-device coordination message includes the bit indicator indicating whether the resource is reserved by at least one of:
 the UE that requested the transmission of the single device-to-device coordination message, or
 a UE other than the UE that requested the transmission of the single device-to-device coordination message.

15. A user equipment (UE) for wireless communication, comprising:
 a memory; and
 one or more processors, coupled to the memory, configured to:
  receive a UE-common device-to-device coordination message transmitted to a plurality of UEs, wherein the UE-common device-to-device coordination message includes a bit indicator indicating an availability of a resource;
  perform pre-transmission sensing of whether the resource is available based at least in part on a content of the UE-common device-to-device coordination message; and
  communicate on the resource based at least in part on identifying that the resource is available, wherein identifying that the resource is available is based at least in part on a value of the bit indicator and whether the UE attempted to reserve the resource.

16. The UE of claim 15, wherein the UE-common device-to-device coordination message includes an identifier of a set of UEs that reserved the resource.

17. The UE of claim 15, wherein the UE-common device-to-device coordination message includes the bit indicator indicating whether the resource is reserved by at least one of:
 a UE that requested transmission of the UE-common device-to-device coordination message, or
 a UE other than the UE that requested the transmission of the UE-common device-to-device coordination message.

18. The UE of claim 15, wherein the one or more processors are further configured to:
 determine whether the resource is available based at least in part on a result of performing the pre-transmission sensing and a stored configuration for evaluating the result.

19. The UE of claim 15, wherein the one or more processors, to receive the UE-common device-to-device coordination message, are configured to:
 receive the UE-common device-to-device coordination message based at least in part on an index value identifying a payload of the UE-common device-to-device coordination message.

20. A user equipment (UE) for wireless communication, comprising:
 a memory; and
 one or more processors, coupled to the memory, configured to:
  receive a device-to-device coordination message indicating whether a resource is available for use by one or more UEs, wherein the device-to-device coordination message includes a bit indicator set to a value, from a set of values for the bit indicator, that indicates an availability of the resource, wherein the set of values for the bit indicator comprises:
   a first value indicating that the resource is unavailable to a UE that requested transmission of the device-to-device coordination message,
   a second value indicating that the resource is available to the UE that requested the transmission of the device-to-device coordination message and subject to another resource reservation by another UE,
   a third value indicating that the resource is available to any UE, and
   a fourth value indicating that the resource is unavailable to any UE except the UE that requested the transmission of the device-to-device coordination message; and
  communicate on an available resource identified by the device-to-device coordination message.

21. The UE of claim 20, wherein the device-to-device coordination message is a UE-specific device-to-device coordination message; and
 wherein the one or more processors are further configured to:

determine whether the resource is available based at least in part on a content of the device-to-device coordination message.

22. The UE of claim 20, wherein the device-to-device coordination message includes an identifier of a set of UEs that reserved the resource.

23. The UE of claim 20, wherein the device-to-device coordination message includes the bit indicator indicating whether the resource is reserved by at least one of:
the UE that requested the transmission of the device-to-device coordination message, or
a UE other than the UE that requested the transmission of the device-to-device coordination message.

24. The UE of claim 20, wherein the one or more processors are further configured to:
perform pre-transmission sensing of whether the resource is available based at least in part on a content of the device-to-device coordination message.

25. The UE of claim 24, wherein the one or more processors are further configured to:
determine whether the resource is available based at least in part on a result of performing the pre-transmission sensing and a stored configuration for evaluating the result.

26. A user equipment (UE) for wireless communication, comprising:
a memory; and
one or more processors, coupled to the memory, configured to:
receive a device-to-device coordination message indicating whether a resource is available for use by one or more UEs, wherein the device-to-device coordination message includes a prioritization associated with an available resource relative to a prioritization associated with one or more other available resources; and
communicate on the available resource identified in the device-to-device coordination message based at least in part on the prioritization associated with the available resource that is included in the device-to-device coordination message.

27. The UE of claim 26, wherein the device-to-device coordination message is a UE-specific device-to-device coordination message; and
wherein the one or more processors are further configured to:
determine whether the resource is available based at least in part on a content of the device-to-device coordination message.

28. A network entity for wireless communication, comprising:
a memory; and
one or more processors, coupled to the memory, configured to:
receive first signaling identifying a user equipment (UE) as configured for device-to-device communication; and
transmit second signaling indicating that a device-to-device coordination message, that is associated with an identification of available resources for device-to-device communication, includes a bit indicator set to a value, from a set of values for the bit indicator, that indicates an availability of a resource, wherein the set of values for the bit indicator comprises:
a first value indicating that the resource is unavailable to a UE that requested transmission of the device-to-device coordination message,
a second value indicating that the resource is available to the UE that requested the transmission of the device-to-device coordination message and is subject to resource reservation by another UE,
a third value indicating that the resource is available to any UE, and
a fourth value indicating that the resource is unavailable to any UE except the UE that requested the transmission of the device-to-device coordination message.

29. The network entity of claim 28, wherein the second signaling indicates a quantity of bits that are included in the device-to-device coordination message.

* * * * *